United States Patent [19]
Von Meister et al.

[11] Patent Number: 5,199,062
[45] Date of Patent: Mar. 30, 1993

[54] TELEPHONE COMMUNICATIONS SYSTEM INCLUDING A DIGITAL TELEPHONE SWITCH, A VOICE RESPONSE UNIT AND A STORED PROGRAM SEQUENCE FOR CONTROLLING BOTH THE SWITCH AND THE VOICE RESPONSE UNIT

[75] Inventors: William F. Von Meister, Great Falls; Mark Foster, Falls Church, both of Va.

[73] Assignee: Phone Base Systems Inc., Vienna, Va.

[21] Appl. No.: 789,398

[22] Filed: Nov. 8, 1991

Related U.S. Application Data

[63] Continuation of Ser. No. 639,739, Jan. 11, 1991, abandoned, which is a continuation of Ser. No. 147,102, Jan. 20, 1988, abandoned.

[51] Int. Cl.⁵ ............... H04M 3/50; H04M 3/54; H04M 3/56; H04Q 11/04
[52] U.S. Cl. .......................... 379/67; 379/89; 379/196; 379/205; 379/207; 379/211; 379/212; 379/216; 370/62
[58] Field of Search ............ 379/88, 89, 67, 84, 379/201, 211, 213, 214, 233, 212, 202, 204, 205, 216, 196, 197, 198, 199, 355; 370/61, 62; 359/135–137, 165, 167

[56] References Cited

U.S. PATENT DOCUMENTS

| | | |
|---|---|---|
| 3,302,182 | 1/1967 | Lynch et al. ............... 380/49 |
| 4,054,756 | 10/1977 | Comella et al. ............. 379/89 |
| 4,371,752 | 2/1983 | Matthews et al. ........... 379/89 |
| 4,375,083 | 2/1983 | Maxemchuk ............... 364/900 |
| 4,440,986 | 3/1984 | Thorson ..................... 379/290 |
| 4,528,658 | 7/1985 | Israel ........................ 379/94 X |
| 4,556,761 | 12/1985 | Hashimoto ................. 379/73 |
| 4,577,062 | 3/1986 | Hilleary et al. ............. 379/88 |
| 4,580,012 | 4/1986 | Matthews et al. ........... 379/89 |
| 4,580,016 | 4/1986 | Williamson ................. 379/31 |
| 4,581,486 | 3/1986 | Matthews et al. ........... 379/88 |
| 4,585,906 | 4/1986 | Matthews et al. ........... 379/88 |
| 4,589,107 | 5/1986 | Middleton et al. .......... 370/62 |
| 4,602,129 | 6/1986 | Matthews et al. ........... 379/88 |
| 4,625,081 | 11/1986 | Lotito et al. ............... 379/88 |
| 4,640,991 | 2/1987 | Matthews et al. ........... 379/88 |
| 4,646,346 | 2/1987 | Emerson et al. ............ 379/214 |
| 4,652,700 | 3/1987 | Matthews et al. ........... 379/89 |
| 4,747,124 | 5/1988 | Ladd ......................... 379/67 |
| 4,757,267 | 7/1988 | Riskin ....................... 379/113 |
| 4,757,525 | 7/1988 | Matthews et al. ........... 379/89 |
| 4,763,350 | 8/1988 | Immendorfer et al. ....... 379/67 |
| 4,785,408 | 11/1988 | Britton et al. .............. 364/513.5 |
| 4,797,910 | 1/1989 | Daudelin ................... 379/67 |
| 4,797,913 | 1/1989 | Kaplan et al. .............. 379/91 |
| 4,809,321 | 2/1989 | Morganstein et al. ....... 379/67 |
| 4,823,374 | 4/1989 | Verlohr ..................... 379/67 |
| 4,827,500 | 5/1989 | Binkerd et al. ............. 379/88 |
| 4,847,890 | 7/1989 | Solomon et al. ............ 379/67 |
| 4,893,328 | 1/1990 | Peacock .................... 379/67 |
| 4,899,373 | 2/1990 | Lee et al. ................... 379/207 |
| 4,979,206 | 12/1990 | Padden et al. .............. 379/67 |

FOREIGN PATENT DOCUMENTS

| | | | |
|---|---|---|---|
| 0086357 | 5/1984 | Japan ..................... | 379/89 |
| WO89/00793 | 1/1989 | World Int. Prop. O. ..... | 381/42 |

OTHER PUBLICATIONS

"A Pabx That Listens and Talks", H. Mulla, *Speech Technology*, No. 2, Jan.–Feb. 1984, pp. 74–79.

"Application of Speech Recognition and Synthesis to Pabx Service", Mulla and Vaughan, *Electrical Communication*, vol. 59, No. 3, pp. 273–280, publ'd. May 6, 1985.

"The AT&T Multi-Mode Voice Systems–Full Spectrum Solutions For Speech Processing Applications", S. D. Hester et al., *Proceedings of the 1985 Avios Conference*, Sep. 1985, 12 pages.

*Primary Examiner*—Thomas W. Brown
*Attorney, Agent, or Firm*—Browdy and Neimark

[57] ABSTRACT

The present invention relates to a telephone communication system which includes a telephone switch having a plurality of incoming and outgoing lines for switching calls therebetween, an audio response unit for receiving audio communications from a user and for generating and transmitting voice communications, and a central processing unit for executing a stored program sequence based upon the audio communications received by the voice response unit to control both the voice response unit and the telephone switch. The central processing unit may be connected within the voice response unit or externally thereto.

43 Claims, 26 Drawing Sheets

Microfiche Appendix Included
(1 Microfiche, 79 Pages)

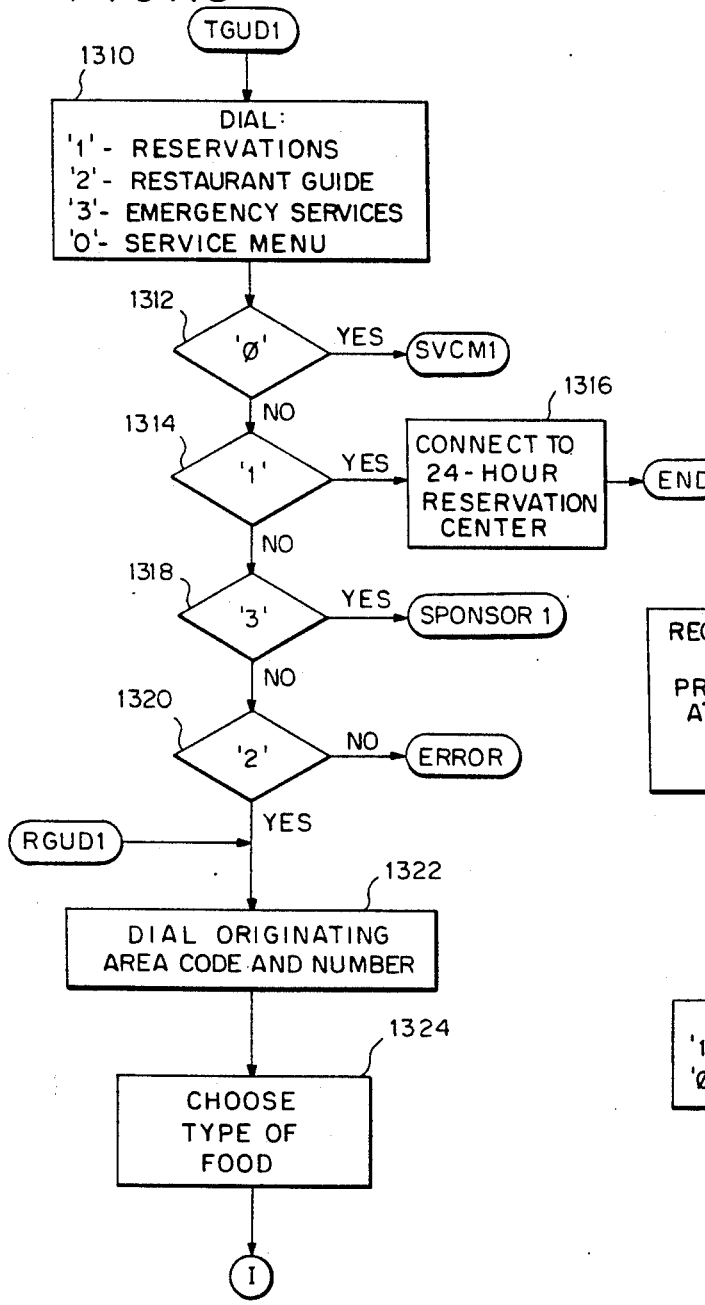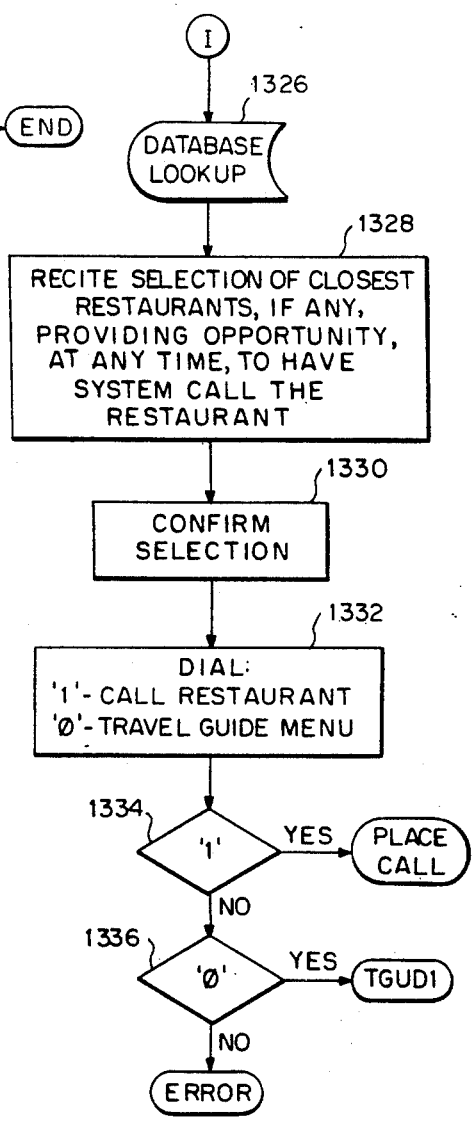

1

TELEPHONE COMMUNICATIONS SYSTEM INCLUDING A DIGITAL TELEPHONE SWITCH, A VOICE RESPONSE UNIT AND A STORED PROGRAM SEQUENCE FOR CONTROLLING BOTH THE SWITCH AND THE VOICE RESPONSE UNIT

This application is a continuation of application Ser. No. 07/639,739; filed Jan. 11, 1991, now abandoned, which was a continuation of application Ser. No. 147,102; filed Jan. 20, 1988, now abandoned.

A microfiche Appendix has been provided which lists the object code of the program which controls the telephone communications system according to the present invention. There is 1 microfiche, with 79 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a telephone communications system which includes a digital telephone switch, a voice response unit and a central processing unit, the telephone switch and the voice response unit being controlled by a common program sequence stored in the central processing unit.

2. The Prior Art

In today's busy and mobile business world, approximately 75% of the business calls initiated do not reach the intended party when they are first placed. This occurs because business persons are not generally available at any one place during the course of the business day. In addition, time zone differentials contribute to the likelihood of incomplete and missed calls. While personal secretaries are able to facilitate business communications for certain senior executives, in many cases, such support staff members are not cost justifiable even in large firms. In addition, the message notation provided by secretaries and answering services generally include brief written messages, but interactive conversation is not possible.

It is for this reason that electronic telephone-answering machines and voice mail systems are becoming more wide-spread since they can record and play back such messages. While both the answering services and messaging machines provide for the receipt of messages, they do not always work well because messages are often too long, too complex, or too personal for the caller either to record comfortably in a certain time period or to leave with a third party. Further, these systems provide only one-way messaging.

A number of systems exist which provide a partial solution to the problems encountered by mobile executives. In these systems, a PBX is connected to a voice response unit. The voice response unit acts as a slave device to the PBX, each separately controlled. The voice response unit sees the PBX as just another telephone line and the PBX sees the voice response unit as just another telephone port. However, as will be discussed below, none of these systems provide the comprehensive solutions offered by the system according to the present invention wherein the telephone switch and the voice response unit are controlled by a common stored program sequence.

U.S. Pat. No. 4,371,752 to Matthews et al. discloses a telecommunication voice mail system (VMS) which allows subscribers to leave verbal messages for automatic delivery to a number of third parties. In addition, users may call the system at anytime to determine whether messages have been deposited for them. In order to have the system address a message to a number of addressees, the user dials the VMS and identifies himself using a unique authorization code. After entering the addresses of the addressees to which the communication is to be delivered, consisting of the telephone number including area code, the user records the message for delivery. To deliver the messages, the VMS places the call to the message recipient. When the recipient answers, he is required to identify himself by an authorization number. If the message addressee has not answered or the telephone is busy, the VMS is programmed to call back a predetermined number of times at predetermined time intervals until contact has been made. Once the user has been identified by his authorization number, the VMS plays back the recorded message for that particular user. This patent is distinguishable from the present invention in a very important way: the patented system does not include a telephone switch connected to a voice response unit controlled by a common stored program sequence to provide the capabilities of allowing subscribers to place calls through the system and leave messages for the addressee only when the call goes unanswered or the line the busy. The VMS also lacks numerous other features provided by the system according to the present invention.

U.S. Pat. No. 4,580,012 to Matthews et al. is a continuation-in-part application of U.S. Pat. No. 4,371,752. The '012 system includes a variety of additional features, for example, a priority hold feature, which allows the user to place the VMS in a mode whereby a priority message can be automatically relayed to the telephone of the user. This is again different from the present application in which an actual call from a VIP is routed directly to the telephone number which the subscriber has left. This system, like its parent, does not include a voice recognition system, nor does it allow subscribers to leave a message in response to an uncompleted telephone call.

U.S. Pat. Nos. 4,652,700, 4,581,486, 4,585,906, 4,602,129 and 4,640,991, all to Matthews et al. are all continuation-in-part applications of the application which resulted in U.S. Pat. No. 4,371,752. Each of the patents relates to various features of the originally described voice messaging system. As discussed above, none of the patents disclose a method and means by which a subscriber can make use of a variety of telephone services including leaving recorded messages for later playback when a dialed party is not available and a voice recognition system allowing the user or the subscriber to verbally participate in selecting the various features of the system, as is available according to the present invention.

The remaining patents and systems are only peripherally related to the present invention.

U.S. Pat. No. 4,646,346 to Emerson et al. discloses an integrated message service system which is essentially a voice mail system, allowing the user to record a message for later access and playback. The telephone switching system that serves the subscriber provides a number of message services (mail, message center, etc.) and integrates the control of these services so that the subscriber is provided with a single indication of the location of all messages awaiting retrieval on all message service systems. The system is passive in that a voice message is recorded and placed in a mailbox assigned to each identified recipient, awaiting the later call back of the recipient, without the capability of actively calling the recipient to playback the message.

U.S. Pat. No. 4,054,756 to Comella et al. discloses a system for serving special service telephone calls on a wholly automatic basis without operator intervention. These special service calls includes calls such as collect, person-to-person and charged-third party calls. The system controls the type of call made by asking the calling party to dial a digit corresponding to the particular type of call desired.

U.S. Pat. No. 4,577,062 to Hilleary et al. discloses a system which is capable of accumulating data which is constantly changing and passing this information to already existing telephone equipment. The information includes things such as weather reports, airline information and stock and security prices. The users may be required to transmit some form of identification signal to the system to identify the caller as being a member of a directory such as subscribers of a particular information service. This identification signal would be dialed into a telephone set.

U.S. Pat. No. 4,556,761 to Hashimoto discloses an automatic telephone answering machine which uses a speech synthesizer to deliver the messages to the caller and records the caller's voice on an external tape recorder.

U.S. Pat. No. 4,625,081 to Lotito et al. discloses an automated telephone voice service system which provides automatic recording and editing of voice messages as well as forwarding of recorded voice messages to other accounts and telephone numbers with or without operator assistance. This is basically a voice mail system.

U.S. Pat. No. 4,528,658 to Israel discloses a telephone switching exchange wherein a multiplicity of modular units exchange digital messages in a synchronous manner by way of full-duplex signalling paths.

U.S. Pat. No. 4,580,016 to Williamson discloses a method and system for determining the quality of the communication channel between two or more voice store and forward systems prior to the transmission of messages between the two systems over the communication channel in question.

U.S. Pat. No. 4,589,107 to Mittleton et al. discloses a system whereby PCM speech transmission data are utilized to contain both digitized speech, for example, from a telephone and other data, for example, from a data terminal, in the same channel within a frame having a plurality of channels. This allows the speech and data to be combined in a common information field and simultaneously transmitted in the same channel through a digital switching network to other system users.

U.S. Pat. No. 4,440,986 to Thorson discloses a microprocessor controller used to control a PBX for efficiently providing access to general data processing functions. This system merely allows a number of users to access the same data processing system through the PBX.

U.S. Pat. No. 3,302,182 to Lynch et al. discloses a modular system for processing, storing and forwarding messages. Individual or group messages may be processed through the system. This system provides a secure message switching center implemented using a totally modular data processor. Messages which are passed through the system may be clear or cryptographic messages passed via a digital data processor. In other words, this message system does not relate to telephone communication but instead controls messages transmitted between teletype systems.

AT&T markets a system called "CALL EXPRESS". This system is merely a voice mail system which does not include any telephone switching capabilities or voice recognition capabilities.

Cellular, or mobile telephones are also used increasingly as an alternative or supplement to answering services and messaging machines. Used by many business executives, cellular telephones, some of which are portable, allow immediate access to make and receive telephone calls. Some models accept call forwarding, the automatic transfer of an incoming call from one number and location to another telephone. However, when the user finds answering inconvenient, generally, the call cannot be automatically routed to another location.

As mentioned above, conventionally, voice response units have been used as self-contained, slave devices connected to a PBX, the PBX including a CPU. The PBX treats the voice response unit as if it were just another telephone port, or more specifically, an operator revert station. Likewise, the voice response unit treats the PBX as if it were just another telephone line. In these prior art systems, the PBX and the voice response unit are each controlled individually by their own microprocessor or stored control sequence. In contrast, the present invention provides a system by which the voice response unit and the telephone switch are orchestrated by a common stored program sequence to provide enhanced communications functions, such as voice activated control of telephone switching and two-way voice messaging.

SUMMARY OF THE INVENTION

The following provides a narrative summary of the features available through the software designed according to the present invention. A user dials an "800", foreign exchange, or local number, identifies himself as a subscriber, and selects a speed dialing code, possibly with reference to the name or dialed initials representing the person to be called. At any time, the user may make another call without identifying himself again. A voice message may be left in the event of an unanswered call. The user can either instruct the telephone communications system to dial the number until it gets through and deliver the message or to place the message in storage for the called party to retrieve at a later time.

Subscribers may provide courtesy calling privileges for certain people, such as call forwarding for a VIP which allows the VIP's call to be directly routed to the place where the subscriber is currently located, as well as recording messages from guests who are trying to reach the subscriber and are unable to do so. Additionally the subscriber may access travel related information, such as local restaurants, nearest local ATM locations and weather information. If he so desires, the subscriber who is accessing the local restaurant guide can be connected directly by telephone to the restaurant. At any time during a call, the subscriber may access the call conferencing or call recording features.

It is an object of the present invention to provide a telecommunication system in which a voice response unit and a telephone switch are controlled by a common stored program sequence.

It is a further object of the present invention to provide a telecommunication system which includes a digital telephone switch and a voice response unit both controlled by a stored program sequence stored within, and executed by, a central processing unit within, or without, the voice response unit.

It is a further object of the present invention to offer busy professionals and corporate executives an advanced personal communication system with 24-hour accessibility.

It is a further object of this invention to provide a two-way messaging service whereby a subscriber can have a message delivered to either another subscriber or a non-subscriber and conversely, a non-subscriber can leave a message for a subscriber.

It is a further object of this invention to provide a system which combines features such as automatic voice messaging, remote call forwarding, and an integrated personal dialing directory.

It is a further object of this invention to allow non-subscribers to receive messages from subscribers, and to leave vocal replies if the non-subscriber so desires.

It is a further object of this invention to provide touch-tone responses and speaker-dependent voice recognition capabilities to interpret commands delivered by subscribers to control both the voice response unit and the digital telephone switch.

In a preferred embodiment, the present invention relates to a telephone communication node comprising a telephone switch having a plurality of incoming and outgoing lines for switching calls therebetween, an audio voice response unit for receiving first audio communications and for generating and transmitting second audio communications, and control means for executing a stored program sequence based upon the first audio communications received by the audio response unit to control both the audio response unit and the telephone switch.

The method of operating the telephone communications system according to the present invention comprises the steps of producing computer-generated audio messages according to a stored user script, accepting audio user commands from users in response to the computer-generated messages, processing the accepted commands, and controlling a telephone switch and an audio response unit responsive to the processed commands.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodience to the accompanying drawings, in which:

FIGS. 18A and 18B are flowcharts of the travel guide routine of the stored program sequence according to the present invention;

GENERAL DESCRIPTION OF THE PREFERRED EMBODIMENTS

Figure 1:
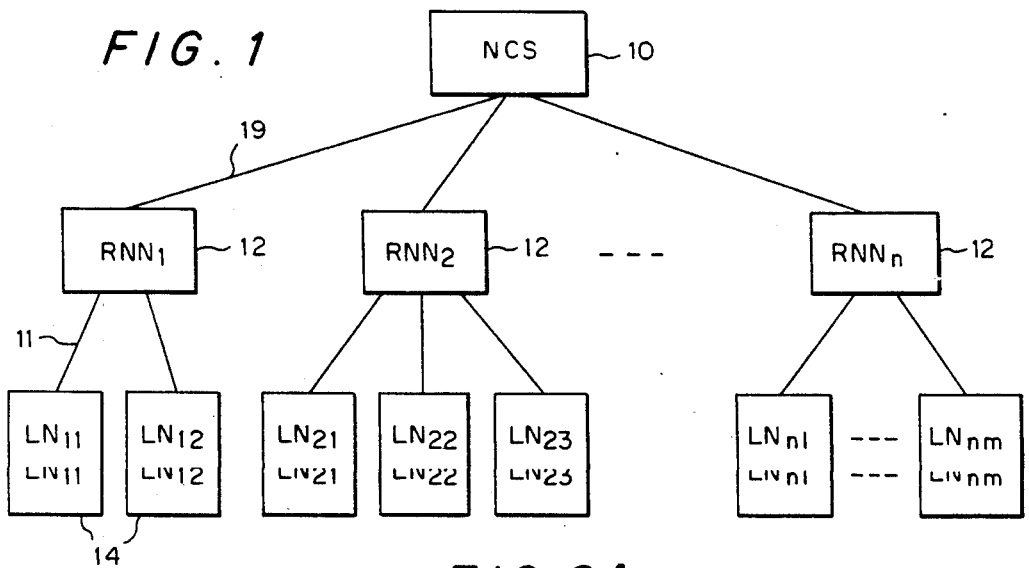
FIG. 1 is a block diagram of the entire communications system according to the present invention.

The system which is the subject of the present invention is a telephone communications system (hereinafter referred to as the System) which provides a large number of capabilities to subscribers, as well as to non-subscribers. In a preferred embodiment, users are connected to the regional network node located in their office and/or home calling area by dialing one of a number of "800" (INWATS), foreign exchange or local telephone numbers from any location in the world using a touch-tone telephone.

Whether or not the caller is a subscriber is determined by the number on which he called. His subscriber status determines which scripts the System will recite and which routines he can access.

If the user is a subscriber, a voice response unit, or VRU, answers the call with a pre-recorded voice message, and requests that he identify himself by dialing his account number. The account number will be his telephone number. The user will then be asked to speak a password which will allow the System to positively identify the person as a subscriber. The System accesses its database of stored account numbers and passwords and compares the received account number and password to the stored values to determine whether there is a match to thereby identify the user as a subscriber.

The System will continue to initiate and respond with a menu of personalized and generic pre-recorded messages which are activated by the subscriber's spoken or dialed commands. Should assistance be required, the caller may dial a single digit and be connected to a System customer service operator.

If the user is not a subscriber, but is determined to be a user who wishes to sign up to become a subscriber, his call is switched to the routine used to enroll new subscribers.

While connected to the System, the subscriber may place a series of calls within the areas serviced by his network on local access telephone lines, as well as long distance calls which are switched through OUTWATS lines. Prompted by the subscriber's verbal instructions, the System will automatically dial the telephone number of any frequently called party (clients, business associates, and/or family members) which has been stored in a speed code dialing directory. Alternatively, the subscriber may directly dial any local or long distance number.

In the event a call is not answered or the line is busy, the subscriber will be able to record a message which the called party may retrieve later. The System may be instructed to automatically continue to dial the called party's number until reaching the party to deliver the subscriber's message. Alternatively, the System may be instructed to store the message for later retrieval. The third parties can be provided with "guest calling" privileges by the subscriber, entitling them to call the System to leave or retrieve messages from a subscriber 24 hours a day. In addition, certain parties listed in the directory may be designated as a "VIP" which entitles them to a greater level of System service. For example, the System may be instructed to recognize a subscriber's VIP callers and automatically forward a VIP's incoming call to any forwarding number the subscriber has left with the System.

As a supplement to the speed dialing directory, the System will offer an informational database which provides travel-related information. If automatic number identification service (ANI) is available from the long distance carrier, it pinpoints the location of the subscriber's call regardless of its point of origin. After the point of origin is determined, either by ANI or by input from the subscriber, the database identifies, and the System voice recites, the location specific information, such as the nearest traveller's check dispenser, automatic teller machines, or sponsor's offices. In addition, the database would include certain important information including emergency telephone numbers, flight schedule information, and destination city weather. In addition, the database would include information for providing reservations and a restaurant guide, and provide the capability of obtaining instant gift services such as sending candy or flowers.

The System will be marketed to potential subscribers individually and through one or more marketing partners or sponsors. These sponsors may be organizations such as credit card companies, frequent flyer programs, or travel groups, through which the System services will be offered to subscribers. The database which stores the additional information may be a generic one which is created by the manufacturers of the System. Additionally, the database may be provided by the sponsors of the System. In this case, the subscriber who enrolled in the System would have access to the database produced by the particular sponsor through which he enrolled.

The System is a voice controlled telephone switching and messaging system including close integration of a digital telephone switch and a digital voice response system controlled by a common stored program sequence stored in and executed by a common central processing unit (CPU). The present invention provides voice and telephone keypad control of switching functions and voice messaging. The system provides voice recognition for controlling telephone switching, placing of multiple outgoing calls with one incoming call, automatic initiating and prompting for voice messaging in the case of incomplete calls, and incoming call authorization and routing to subscriber locations.

The System uses a programmable voice response computer with integrated digital signal processing, including speaker dependent voice recognition, text-to-speech capabilities, and touch-tone recognition capabilities, which controls a fully digital "any-to-any" digital circuit switching matrix.

The present system is a computerized-response telephone service with multiple service and message recording transmission features. A convenience service, it offers busy individuals an advanced communication system with 24-hour accessibility. Messages recorded in the user's voice may be confidentially exchanged between subscribers and other subscribers, their key clients, business associates and family members.

The System uses existing long distance telephone lines owned and operated by local telephone companies.

DETAILED DESCRIPTION OF THE PREFERRED EMBODIMENTS

The System is designed to integrate a telephone switching system (telephone switching matrix) with a voice or audio response unit (VRU) and orchestrate the functions of these two main equipment components through common proprietary, highly complex software applications programs, which are described hereinbelow. The software controls the sequence of events that occur every time the System is accessed.

All subscriber originated calls placed to the System over INWATS carrier lines will be received by the telephone switching matrix and automatically switched to the VRU which prompts the user concerning the availability of various messaging or database functions. The particular messages delivered to the user depend upon the particular INWATS or other telephone line on which the call was received. Based on the responses made by the user, the System instructs the telephone switching matrix to place an outbound call on OUTWATS or local access lines.

The System's design will be replicated in the series of regional network nodes to be located in major cities throughout the United States. This network system is shown in the block diagram of FIG. 1.

NCS 10 is the network control system. This system includes software which monitors the functioning of the network nodes. Regional network nodes $RNN_1$ through $RNN_n$, shown as elements 12, are connected to NCS 10 via high-speed (56 KPBS) switched data circuits 19 leased from a public data network carrier such as TELENET or TYMNET. The circuits will provide the NCS 10 with call usage statistics for billing information from the network nodes, as well as the capability to affect voice file and software updates from a single location. In addition, NCS 10 will support customer service representative terminals as well as being available for general corporate uses.

Each RNN 12 is connected to a number of local network nodes 14 via optical fiber transmission lines 11. The regional network nodes 12 will be placed in the largest United States cities and connected to the local network nodes 14 which will be installed in the smaller cities throughout the country.

Figure 2A:
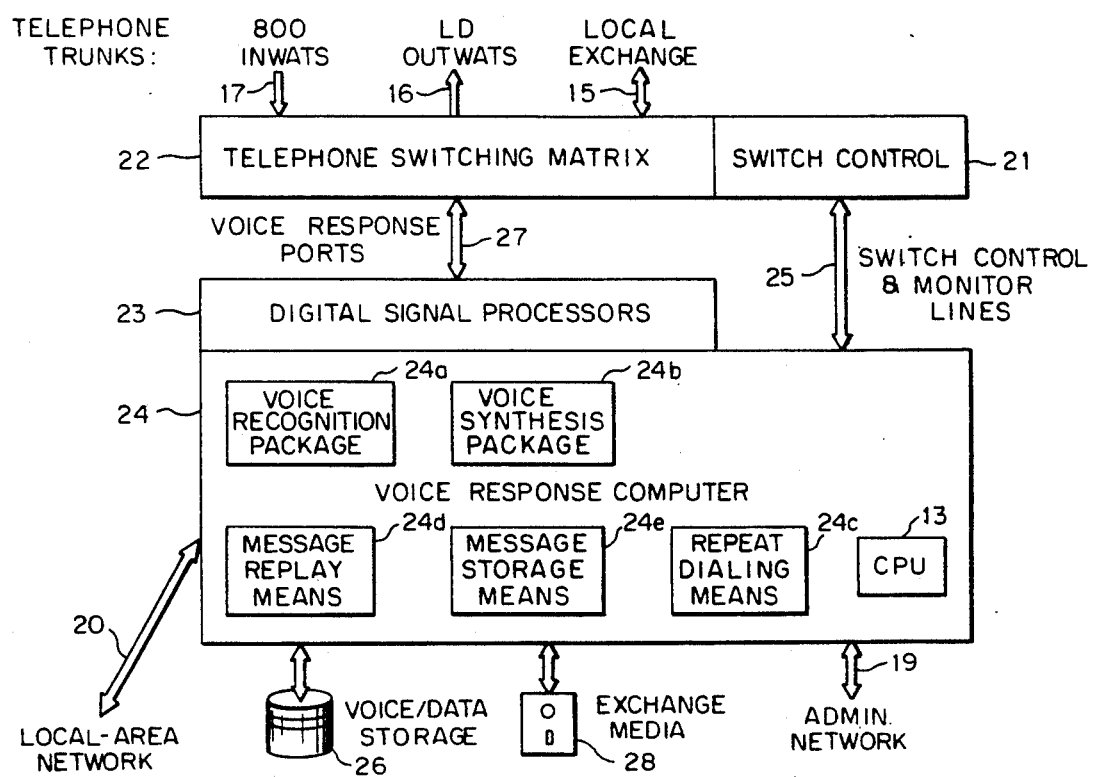
FIG. 2A is a block diagram of the regional network nodes shown in FIG. 1 according to the present invention.

The configuration of each of the regional network nodes 12 is shown in FIG. 2A. Each regional network node site configuration will include a telephone switching matrix 22 connected to an audio response unit or VRU 24 and the software according to the present invention which is programmed into a central processing unit 13. CPU 13 may be connected within VRU 24 as shown in FIG. 2A, or connected externally thereto as shown in FIG. 2C. Based upon the amount of traffic passing through a given RNN 12, two or more VRUs 24 and telephone switching matrices 22 may be connected to one another over a local-area network 20.

The telephone switching matrix 22, in previous systems, was typically connected to a dedicated embedded CPU for driving the switch. In the present device, a standard RS232 cable is used to connect the general purpose data ports on the telephone switching matrix 22 to the VRU 24. Thus, it is the VRU which drives the digital switch and not a dedicated CPU.

Incoming calls enter the regional network node 12 through a number of "800" INWATS trunk lines 17. Outgoing calls are processed through the LD "800" OUTWATS trunk lines 16. Two-way access is also available through local exchange trunk lines 15. Trunk access is provided at the T1 level, that is, a digital circuit with twenty-four simultaneous voice channels, which operate at 1.554 million bits per second. The lines to the local exchange are also provided at the two T1 level.

Digital signal processors 23 interface between the telephone switching matrix 22 and the VRU 24 over voice response ports 27. Switch control 21 controls the switching matrix 23 and provides an interface directly to VRU 24 through switch control and monitor lines 25.

Because the interconnections between the various components are regional, the quality of transmission is less subject to external interference. The minimum network node will be configured with sufficient INWATS, OUTWATS, long-distance, local and port/trunk terminations to accept and process at least twenty-four simultaneous phone calls. The regional network nodes 12 can be expanded as required by increased call traffic.

According to the preferred embodiment of the present invention, the VRU 24 is made by Digital Sound Corporation of Santa Barbara, California. Each VRU 24 has up to 96 ports per rack, requires 4 kW continuous power (20A @125 V), and generates 12,000 BTU's per hour. The Digital Sound Corporation VRU contains within it a voice recognition package 24a and a voice synthesis package 24b provided by Digital Sound Corporation. The VRU is a UNIX-based system which includes a 68000/80386 CPU with 2 to 8 MB of memory. The digital signal processors 23 each consist of a TMS 23020.

Connected to the VRU computer is a voice/data storage medium 26 and an exchange media 28. The storage medium 26 may include up to 4 GB of memory.

The telephone switch of the telephone switching matrix 22 consists of a switching system made by Redcom Laboratories, of Victor, N.Y. The telephone switch is a fully digital class 5 office switch, which requires 1 kW continuous power (85A @48 V or 10A @125 V), and generates 3,000 BTU's per hour. The Redcom switch includes up to 448 ports, non-blocking.

It is understood that any comparable system for either the VRU or the telephone switching matrix may be used to build the present invention.

Figure 2B:
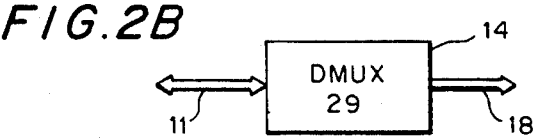
FIG. 2B is a block diagram of the local network nodes shown in FIG. 1 according to the present invention.
Figure 2C:
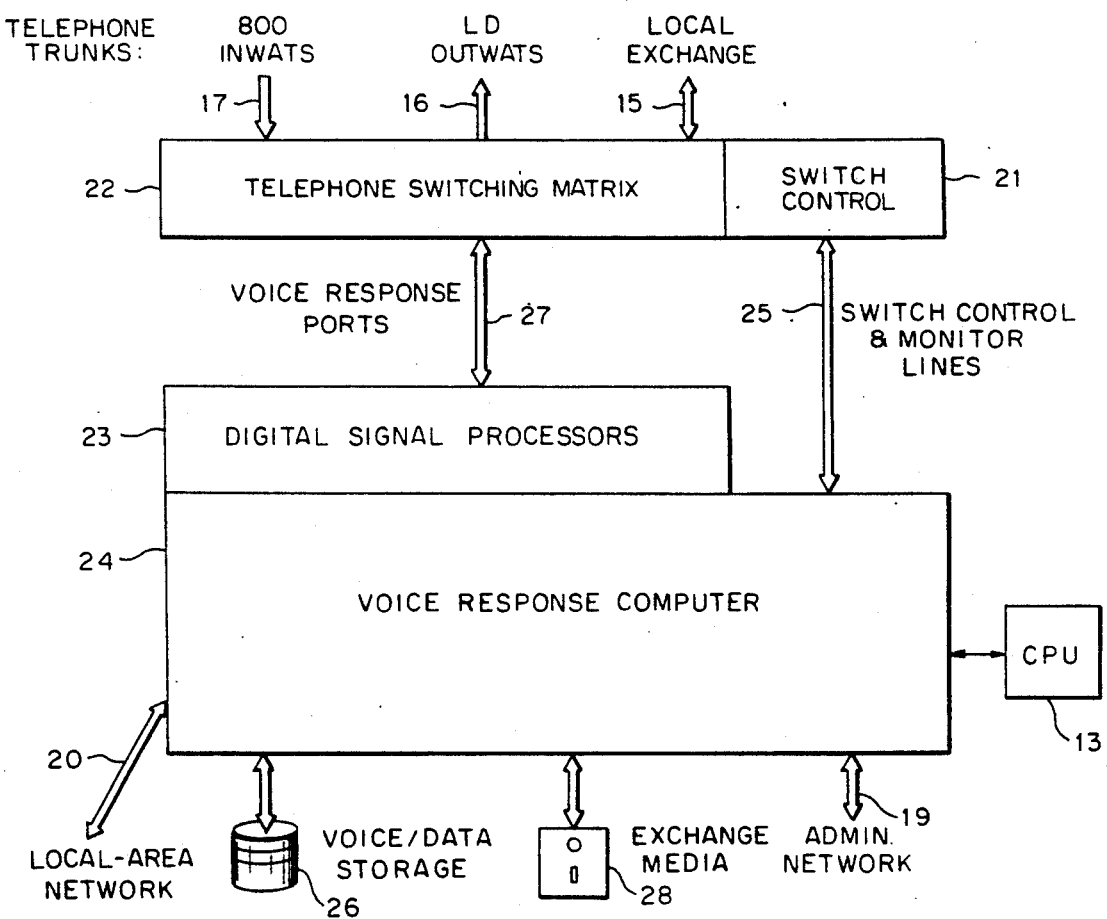
FIG. 2C is an alternative embodiment of the regional network nodes.

The local nodes 14 shown in FIG. 2B will not support telephone switching matrix or VRU equipment on the premises, but are configured with digital (T1) multiplexors 29 which are connected to the closest regional network node via optical fiber transmission lines 11. Calls placed to the local nodes will be routed through the telephone switching matrix/VRU at the closest regional network node. Output from the local nodes 14 will be over lines 18. Local nodes can be updated to regional nodes if the local traffic load exceeds the capacity of twenty-four lines for a period of at least six months.

FIGS. 3-7 each schematically demonstrate the various features of the System which are available to the subscriber 30.

Figure 3:
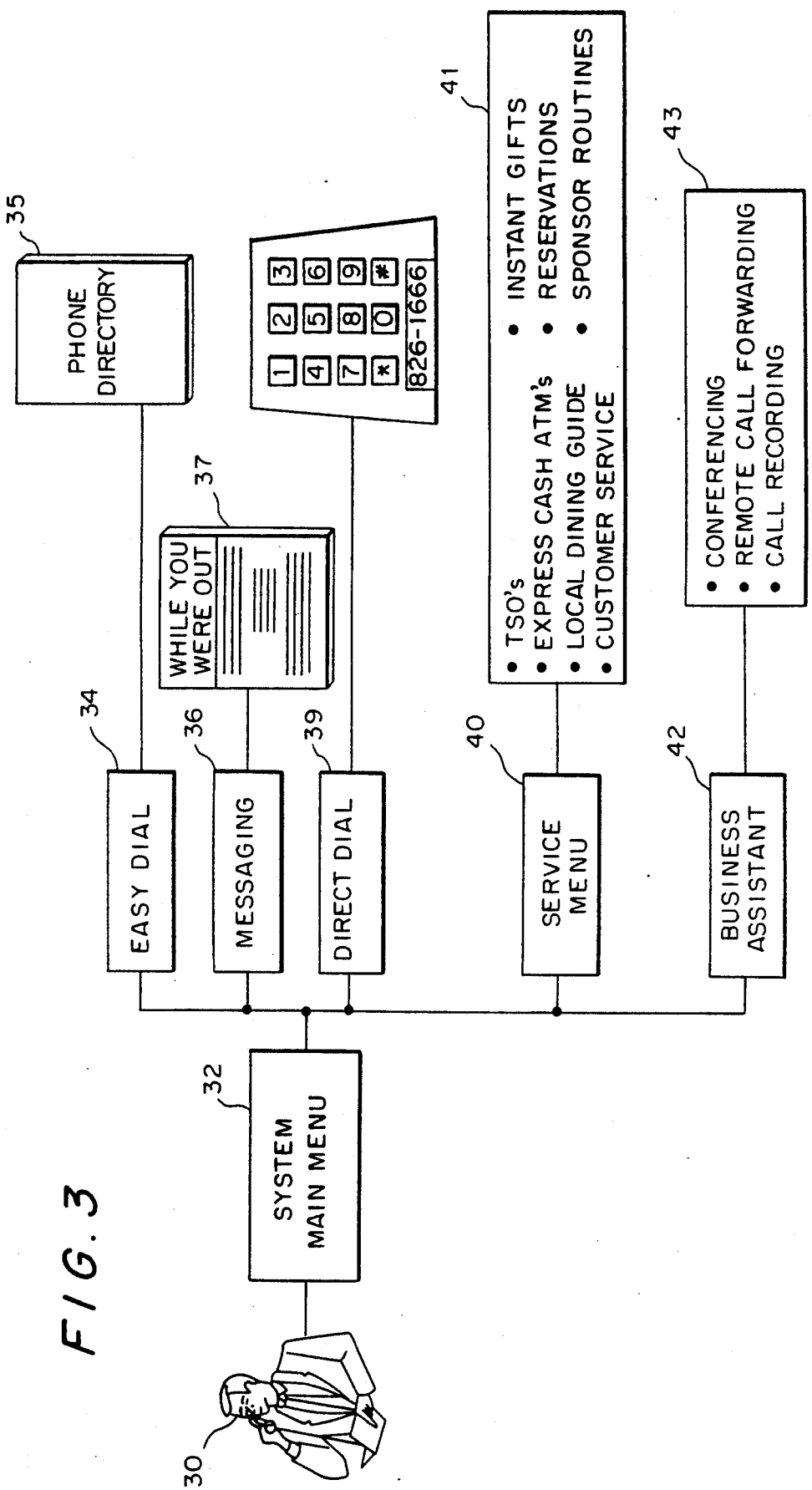
FIG. 3 is a block diagram of the main menu routine of the stored program sequence according to the present invention.

As shown in FIG. 3, the subscriber 30 dials the System and reaches the System main menu 32. Under the main menu, the subscriber may choose the easy dial service 34, the messaging service 36, the direct dial service 38, the service menu 40, or the business assistant 42.

The choice of the easy dial service 34 gives the subscriber access to his personal phone directory 35, with reference to which he may have the VRU 24 place his calls for him. The choice of messaging service 36 allows the user to leave a digitally recorded voice message 37. The choice of direct dial service 38 allows the user to dial the desired number through the telephone keypad 39. The choice of the service menu 40 allows the user to access such services as local restaurant guide, customer service, express cash machines, traveller service organizations, instant gift services, reservations, and various sponsor routines, as shown in block 41. The choice of the business assistant 42 allows the user to access services such as call conferencing, remote call forwarding, and call recording as shown in block 43.

Figure 4:
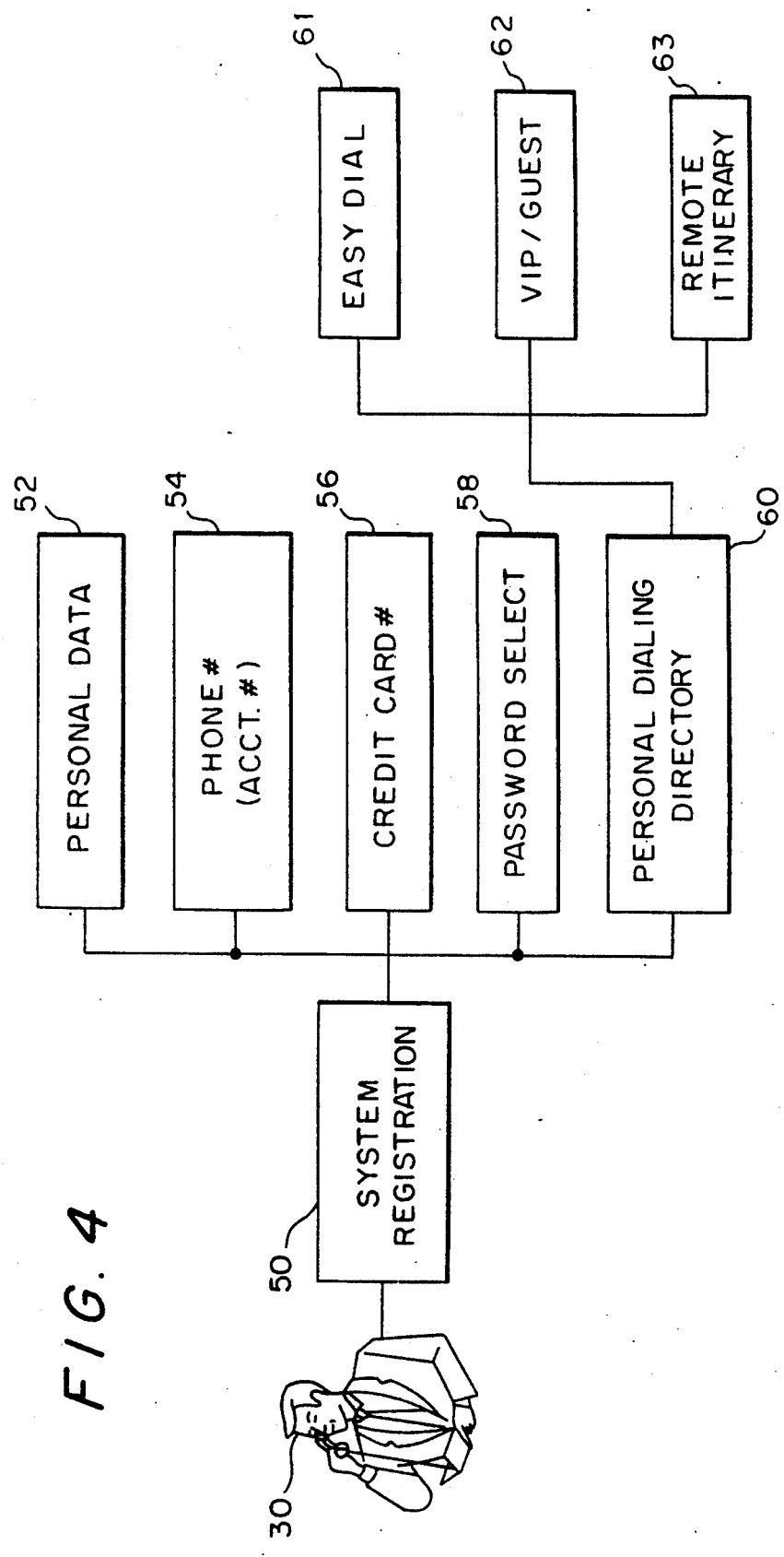
FIG. 4 is a block diagram of the subscriber registration routine of the stored program sequence according to the present invention.

As shown in FIG. 4, when a person 30 dials the main menu 32, if he is a new subscriber, and it is his first access to the System, as determined by the number through which he is connected to the System, he is passed to the subscriber registration routine 50. While in registration routine 50, the subscriber enters his personal data at block 52, his home or office telephone number at block 54 and the credit card number to which he wishes the bills to be charged at block 56. Then he selects his password at block 58. At this time he may choose to create his personal dialing directory 60, or postpone the creation of this directory until a later time. If he chooses to create the personal dialing directory, he enters the easy dial information at block 61, designates his VIPs or guests at block 62, and enters a remote call itinerary if he so desires at block 63.

Figure 5:
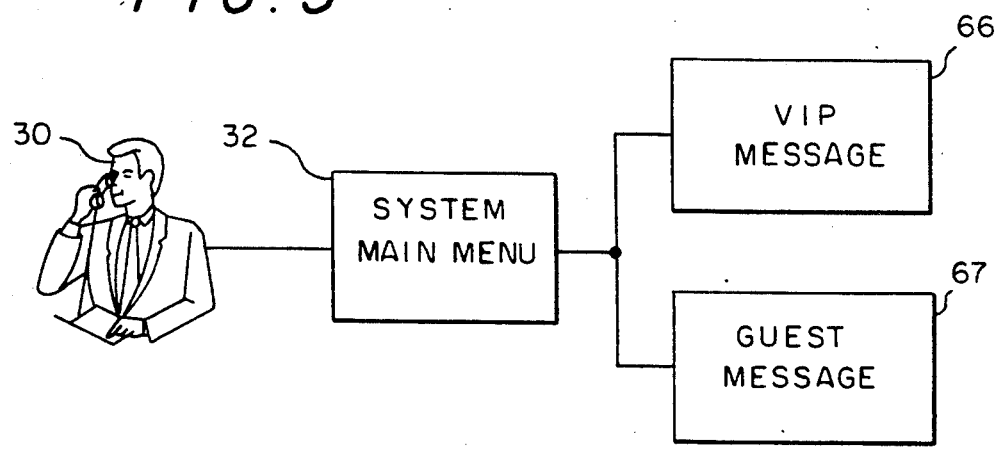
FIG. 5 is a block diagram of the message retrieval routine of the stored program sequence according to the present invention.

As shown in FIG. 5, a subscriber 30 who calls into the System main menu 32 may leave a message for a called party. If the called party is a VIP, shown at block 66, or a guest, shown at block 68, the System may repeatedly dial the dialed party's phone number until it can deliver the recorded message left by the subscriber, or a message may be recorded and left for later retrieval.

Figure 6:
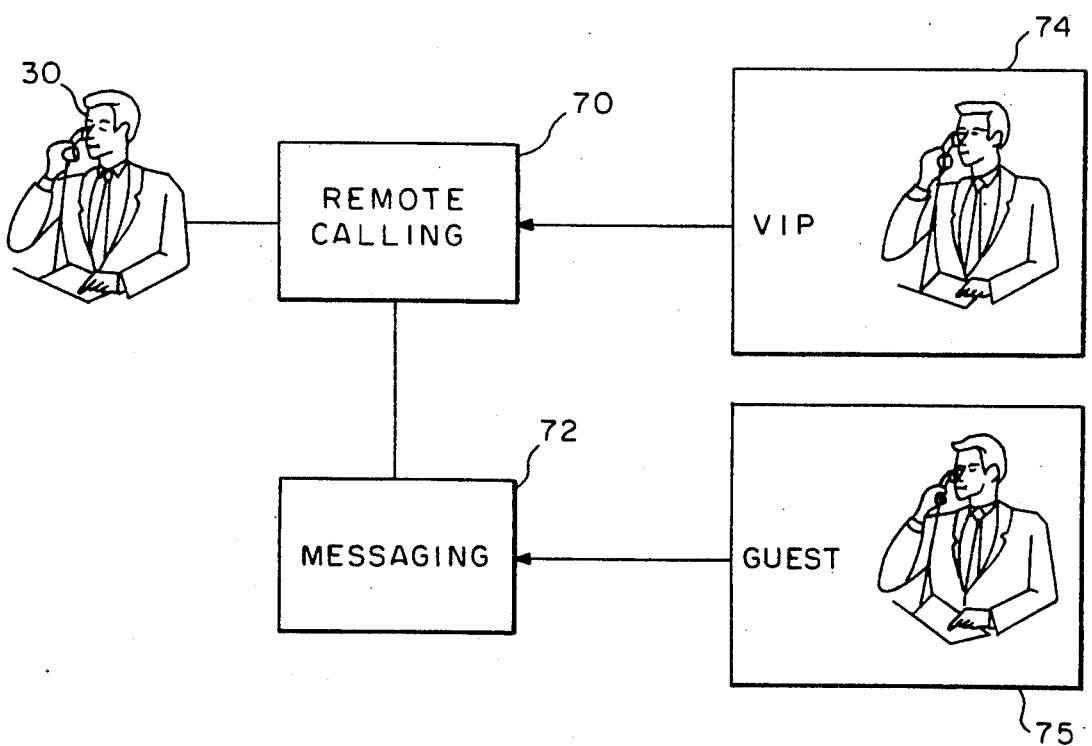
FIG. 6 is a block diagram of the VIP/Guest call-in routine of the stored program sequence according to the present invention.

As shown in FIG. 6, a subscriber 30 who is called by a third party may either be reached by remote calling at block 70, or messaging at block 72. In particular, if the third party is a VIP 74, the System will automatically forward his call to the number which the subscriber has left at which he can be reached, if such a number has been entered by the subscriber 30. If the calling party is a guest 75, the caller can record a message for later retrieval by the subscriber 30.

Figure 7:
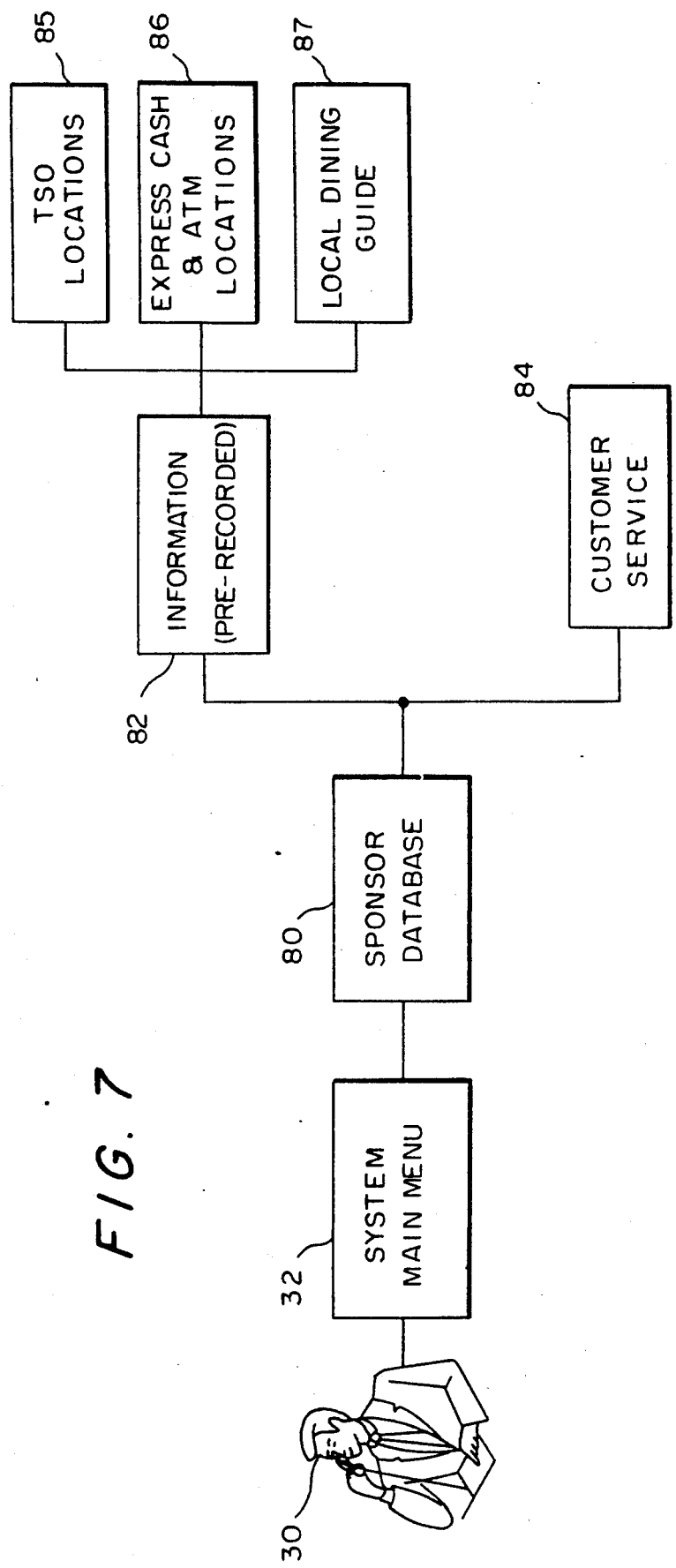
FIG. 7 is a block diagram of the sponsor emergency services routine of the stored program sequence according to the present invention.

As shown in FIG. 7, the subscriber 30 may access the sponsor database menu 80 through the service menu 40 and the main menu 32. If he does so, he may be provided with pre-recorded information 82 or if he so desires, be connected directly to customer service 84. If he accesses the pre-recorded information 82, he can access information such as the nearest TSO locations, the nearest express cash and ATM locations, or the local restaurant guide, 85-87.

FIG. 8-20 illustrate flowcharts showing the logic flow of the software routines for implementing the voice driven software system that controls the telephone switch 22 and the VRU 24.

Figure 8A:
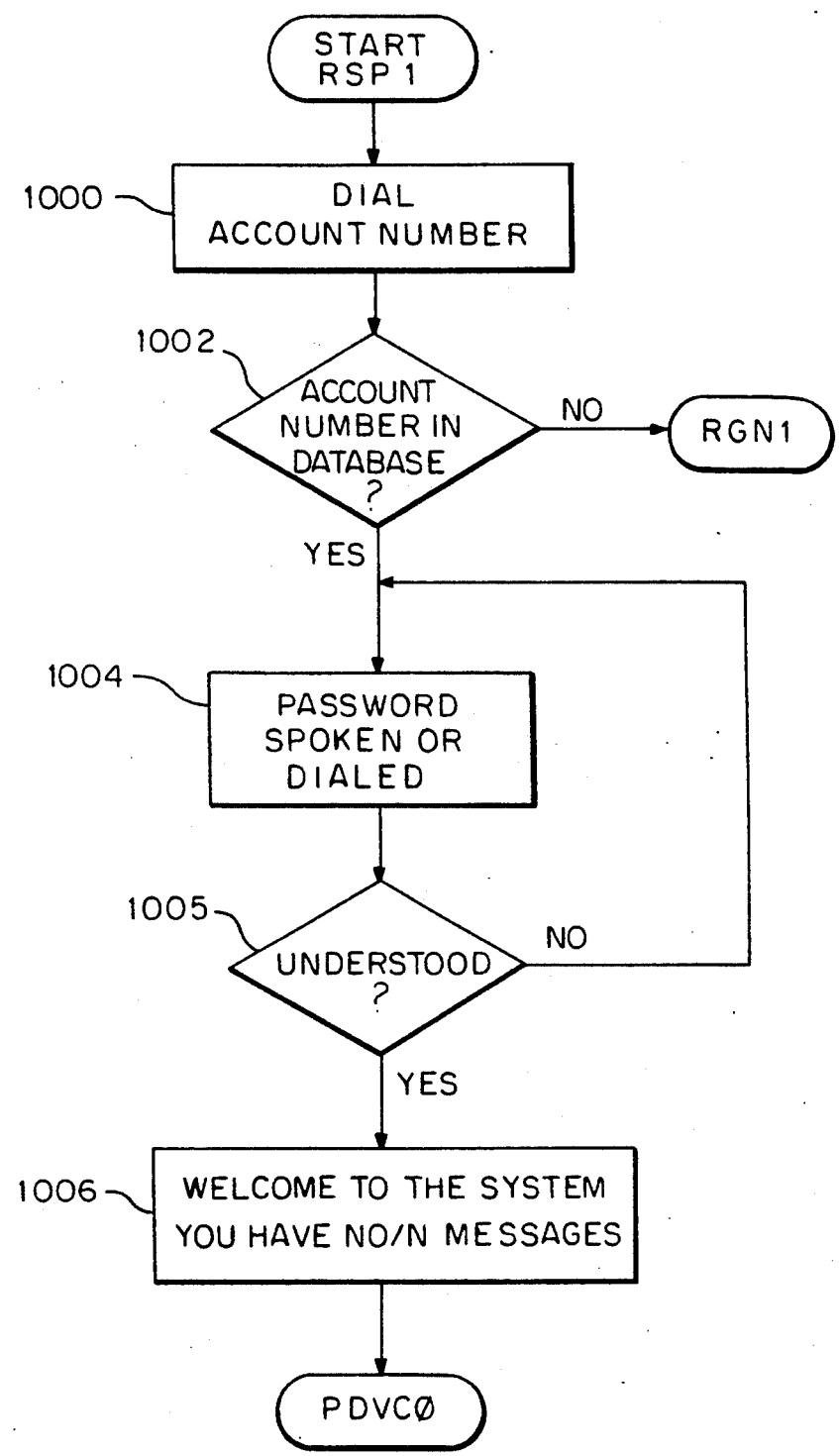
FIG. 8A is a flowchart of the subscriber identification routine of the stored program sequence according to the present invention.
Figure 8B:
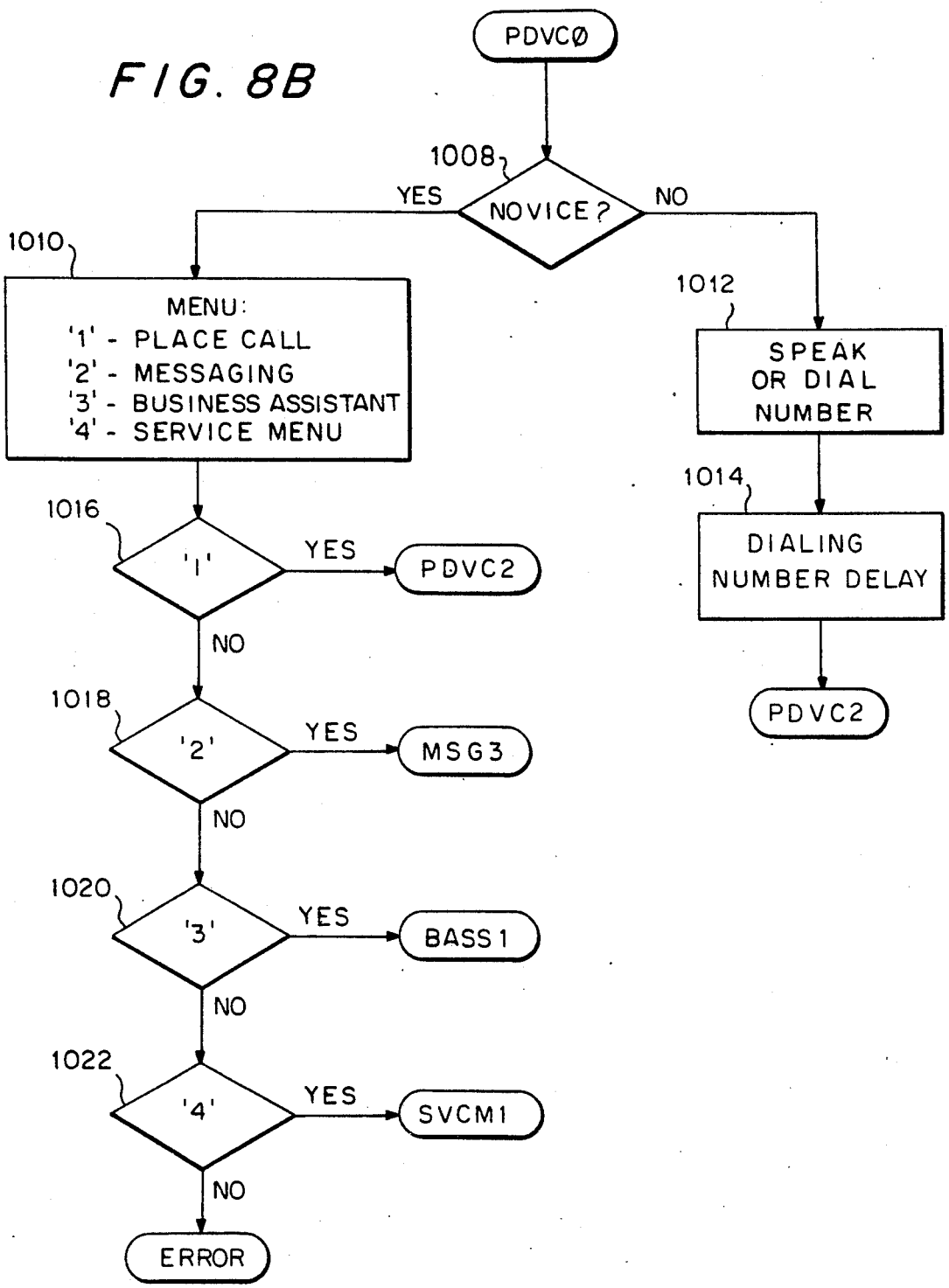
FIG. 8B is a flowchart of the main menu routine of the stored program sequence according to the present invention.

FIGS. 8A and 8B illustrate the start-up and main menu routines. In particular, shown in FIG. 8A, when the user dials the telephone number for System access, the routine is started at node RSP1. The user is asked to dial his account number at step 1000. At step 1002, the System checks whether the account number is in the account database. If not, the routine is directed to node RGN1, the new subscribers' routine, shown in FIGS. 20A and 20B. If the account number is found in the database at step 1002, the user is asked to speak or dial his password at step 1004. At step 1005, the System checks to determine whether the password is understood. If not, the user is asked to repeat his password. It is understood that if the password is not understood after a number of tries, for example three tries, the user will be cut from the system by termination of the call after an appropriate error message is delivered (not shown in flowchart). The System accesses the stored subscriber information (not shown in flowchart) to determine if the account number and password spoken or dialed by the user matches one of the stored account numbers and corresponding password. If so, the user is identified as a subscriber.

Once the user's password is understood and recognized by the System as that of a subscriber, the subscriber is welcomed to the System at step 1006, with an indication of how many messages are awaiting the subscriber's retrieval. At this point, the System enters the routine starting at node PDVC0, shown in FIG. 8B.

At the time the subscriber registers, a novice bit is set. This bit is automatically turned off after the subscriber has accessed the System a number of times, the assumption being that after repeated access, the experienced subscriber does not need the detailed instructions required by the novice subscriber. At step 1008, the novice bit is checked. If the subscriber is not a novice, the subscriber is asked to tell the system to dial a number, representing either a menu selection or a telephone number to be dialed, shown at step 1012. The System delivers a message indicating a brief dialing delay at step 1014. Control is then passed to node PDVC2, shown in FIG. 9A and 9B.

If at step 1008, the novice bit is determined to be set, the main menu is recited to the subscriber at step 1010, requesting that the subscriber dial: a "1" to make a call, a "2" for messaging, a "3" for the business assistant, or a "4" for the service menu. At step 1016, if the subscriber has chosen or dialed a "1", control is passed to node PDVC2 shown in FIGS. 9A and 9B. If the subscriber has dialed a "2" at step 1018, control is passed to node MSG3, illustrated in FIG. 11. At step 1020, if the subscriber has dialed a "3", control is passed shown in FIGS. 13A and 13B. At step 1022, if the subscriber has dialed a "4", control is passed to node SVCM1, shown in FIG. 14.

If none of these numbers have been dialed, control is passed to an error routine which gives an appropriate error message. This routine may be designed so that it affords the subscriber multiple retries to dial the correct number. Upon repeated failures, the subscriber will be connected directly to customer services to obtain assistance from an operator.

Figure 9A:
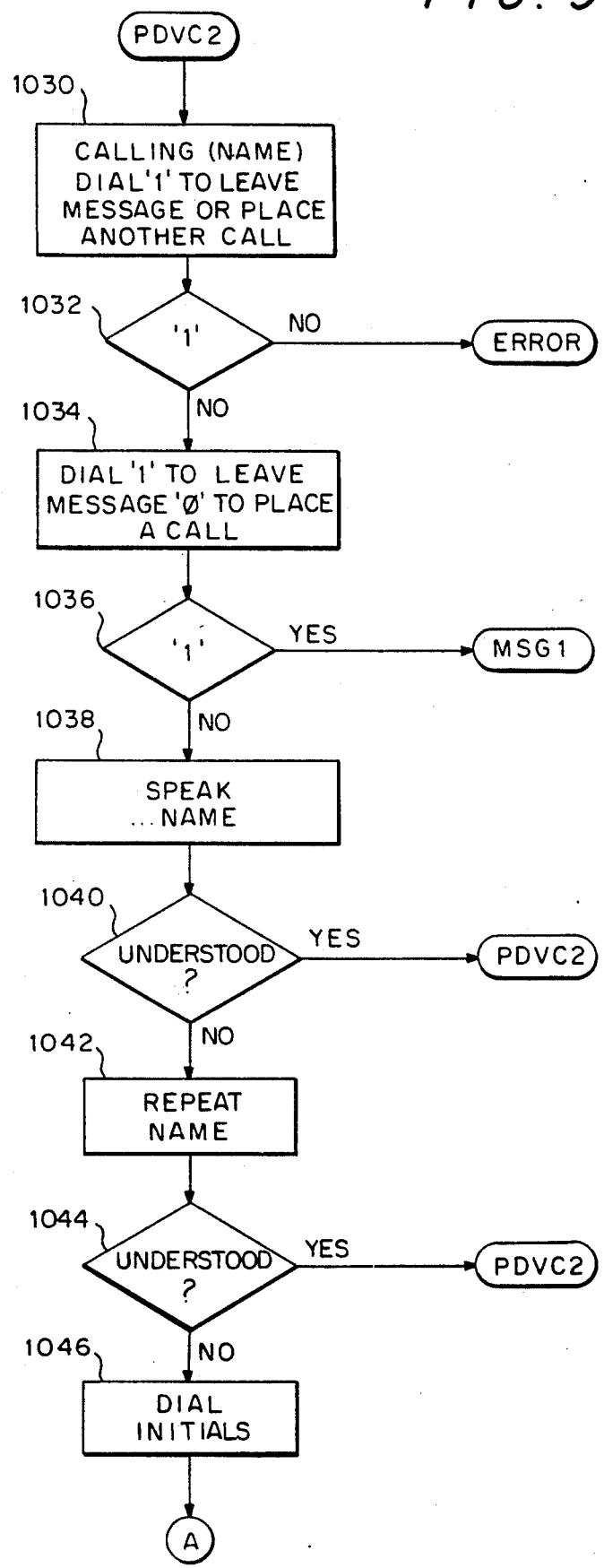
FIGS. 9A and 9B are flowcharts of the routine entered to place a telephone call in the stored program sequence according to the present invention.
Figure 9B:
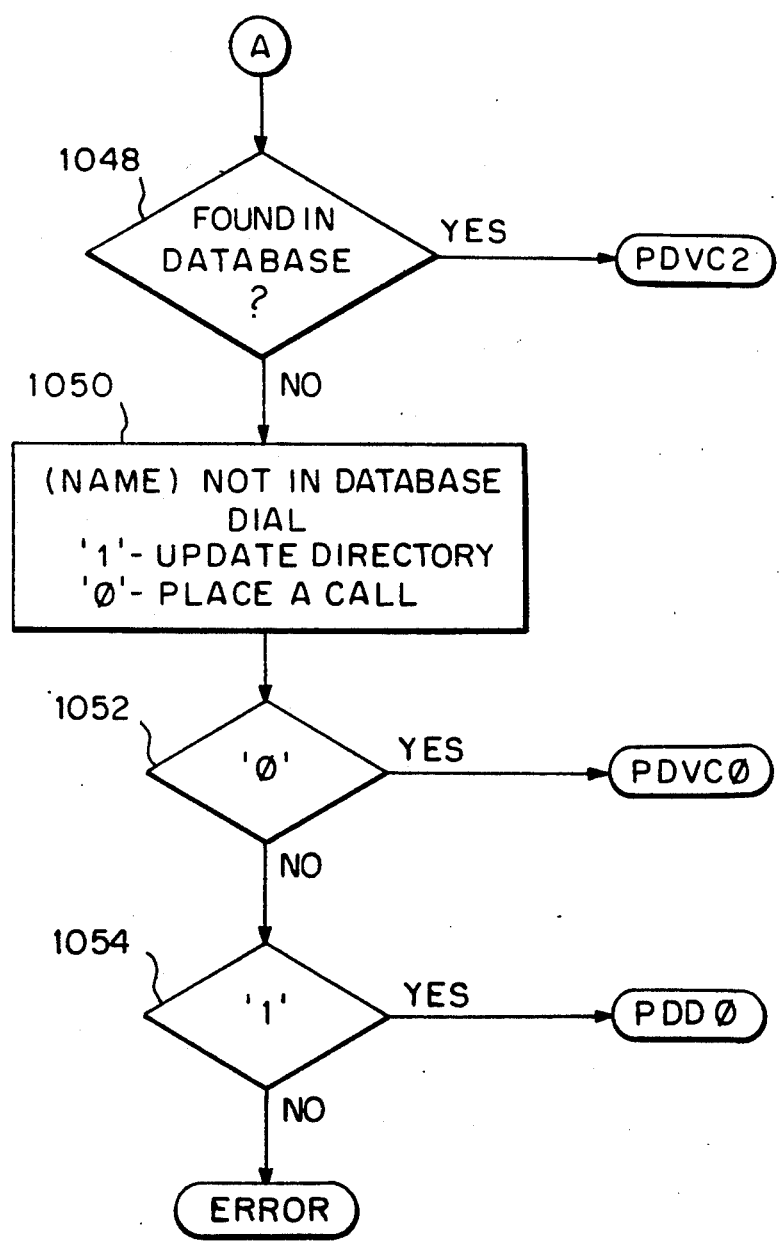

A routine entitled node PDVC2 is illustrated in FIGS. 9A and 9B. As shown in FIG. 9A at step 1030, the subscriber is informed that the System is calling the intended party, by vocalizing his name or initials. The subscriber is informed that in order to leave a message or make another call, he can dial a "1" at any time.

In this way, the subscriber may terminate the call while remaining connected to the System at any time he desires. Thus, if the subscriber is dialing a number which, for example, is located in a small apartment, he may realize that if the phone is not answered within five rings or four rings, the party is not there and he can dial a "1" to leave a message at that point. Likewise, if the subscriber is dialing a party located in an office, or a party who has difficulty reaching the telephone, he may keep ringing the telephone for as many rings as he chooses prior to dialing the "1" to leave a message.

At step 1032, if the subscriber has not dialed a "1" after a given period of time, the System may initiate an error routine, which provides an appropriate error message to the subscriber. If the System detects a "1", the subscriber is asked to dial a "1" to leave a message or "0" to place another call, at step 1034. If a "1" is dialed, at step 1036, the subscriber is passed to node MSG1, described in FIGS. 10A and 10B.

If a "1" has been dialed at step 1036, the subscriber is asked to speak the name of the party to whom he wishes to place the call at step 1038. If the name is understood at step 1040, the routine passes to node PDVC2 shown at the top of FIG. 9A. If the name is not understood, the subscriber is asked to repeat the name at step 1042. At step 1044 the System determines whether the name has been understood. If so, control passes to node PDVC2.

If the name is not understood after the second time, the subscriber is asked to dial the initials of the party he wishes to call, at step 1046. As shown in FIG. 9B, if these initials are found in the database at step 1048, control is passed to node PDVC2. If they are not in the database, the subscriber is given the choice of whether he wishes to make another call by dialing a "0", or update his dialing directory by dialing a "1", shown at step 1050. If a "0" is dialed, at step 1052 control is passed to node PDVC0, the main menu shown in FIGS. 8A and 8B. If a "1" is dialed, at step 1054 control is passed to node PDD0, the routine for updating the personal dialing directory shown in FIG. 15. If neither a "0" or a "1" has been dialed at this point, an appropriate error routine is entered and the appropriate error message is delivered.

Figure 10A:
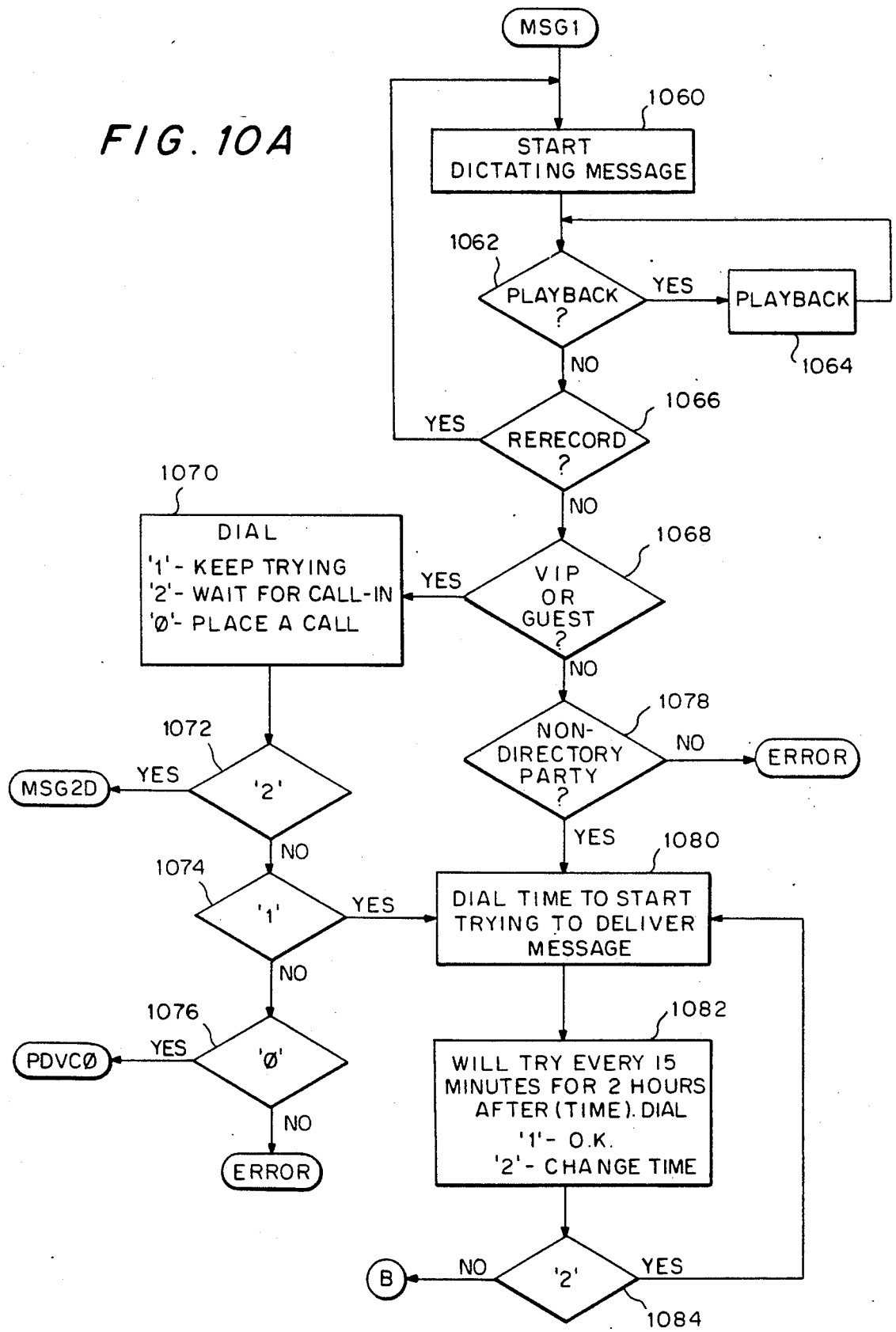
FIGS. 10A and 10B are flowcharts of the messaging routine of the stored program sequence according to the present invention.
Figure 10B:
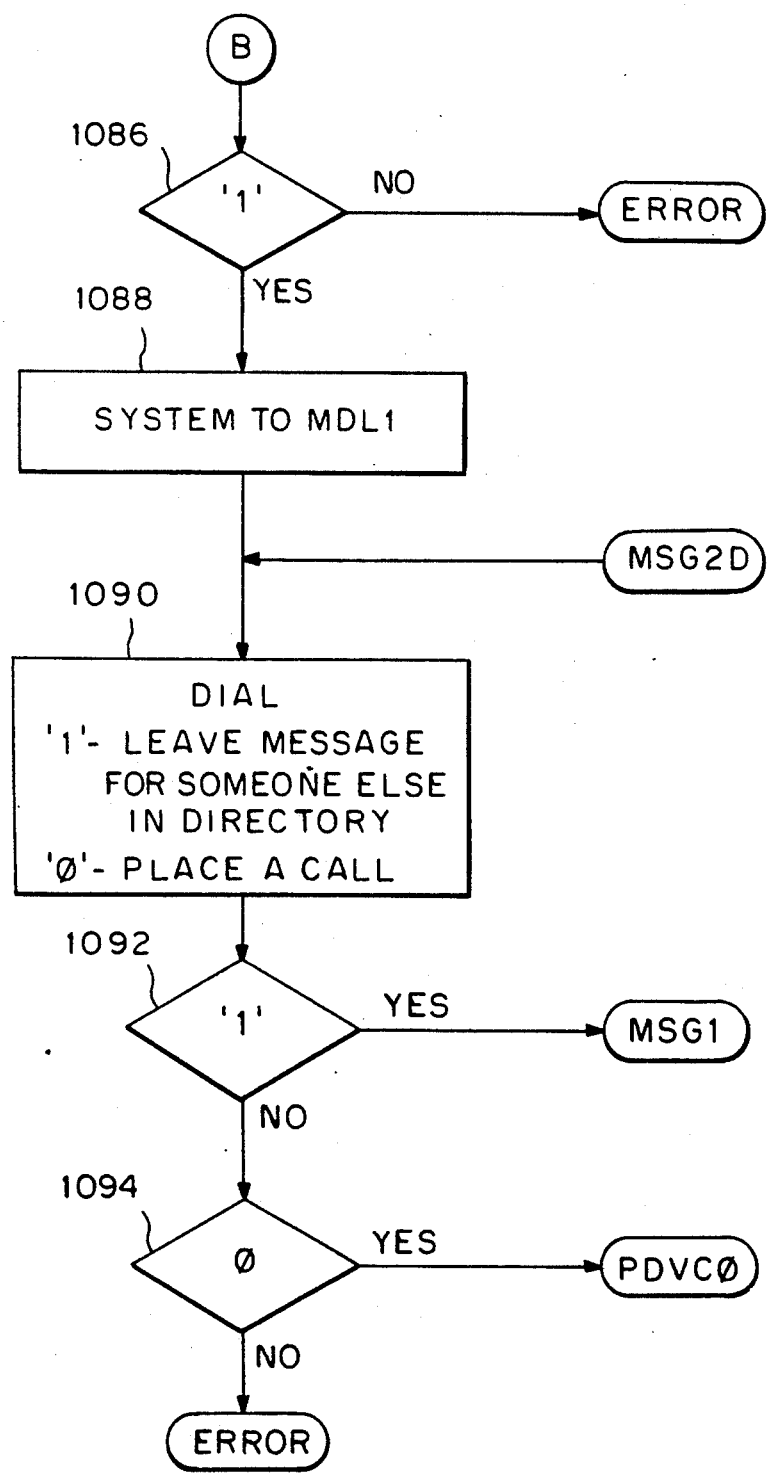

FIGS. 10A and 10B illustrate the routine which is entered in order to leave a recorded message which starts at node MSG1. At step 1060, the subscriber is asked to begin dictating his message using message storage means 24e. At step 1062, the subscriber is asked whether he wishes to replay his message for review. If he chooses to do so, at step 1064 the message is played back and he is asked again whether he wishes to replay it. At step 1066, the subscriber has the opportunity to rerecord the message if he is not satisfied with it.

At step 1068, the System decides whether the person for whom the message is directed is a VIP or a guest. If so, the user is given the opportunity, at step 1070, to choose from the following selections: "1" to keep trying the party, "0" to place another call, or "2" to store the message for later retrieval by the called party. At step 1072, if a "2" has been dialed, the message is stored for the person to call in and retrieve at a later time. Control then passes to node MSG2D shown at step 1090 in FIG. 10B. If a "1" is dialed at step 1074, control passes to step 1080 which is described below. If a "0" is dialed, at step 1076 control passes to node PDVC0. If none of those are chosen, control is passed to an error routine which delivers an appropriate error message.

If the subscriber or the called party is not a VIP or a guest at step 1068, and is not a non-directory party at step 1078, an error routine is accessed and the appropriate error message is delivered. If the party is a non-directory party, control is passed to step 1080.

At step 1080, the subscriber is asked to dial the time at which he wishes the System to start calling the designated party to deliver the message which the subscriber has recorded. At step 1082, the subscriber is informed that the System will try every 15 minutes for two hours after the indicated time (repeat dialing means 24C). He is given the opportunity, at steps 1084 and 1086 (see FIG. 10B) to change the designated time or indicate that the time as set is okay. If neither selection is chosen, an error routine is entered.

If the time is correct as chosen by the subscriber, at step 1088 the System executes, in the background, the routine which starts at node MDL1, shown in FIG. 12, for message delivery. The subscriber, in the foreground, is then asked, at step 1090, whether he wishes to leave a message for someone else by dialing a "1" or place another call by dialing a "0". Node MSG2D is indicated immediately prior to step 1090. At step 1092, if the subscriber has dialed a "1", control is passed to node MSG1. At step 1094, if the subscriber has dialed a "0", control is passed to node PDVC0, shown in FIG. 8B. If neither of these options are chosen, an appropriate error message is delivered.

Figure 11A:
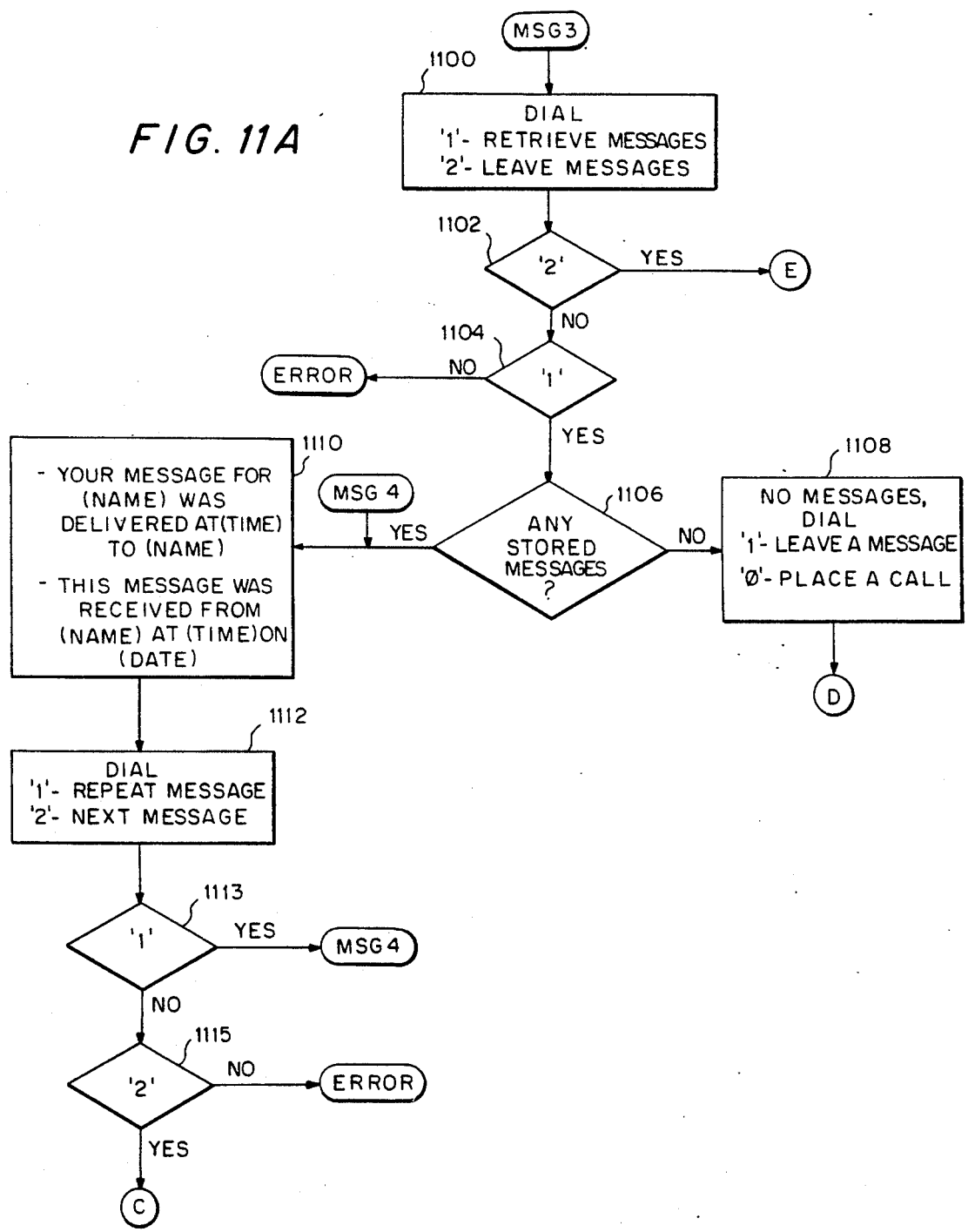
FIGS. 11A, 11B, and 11C are flowcharts of the message retrieval routine of the stored program sequence according to the present invention.
Figure 11B:
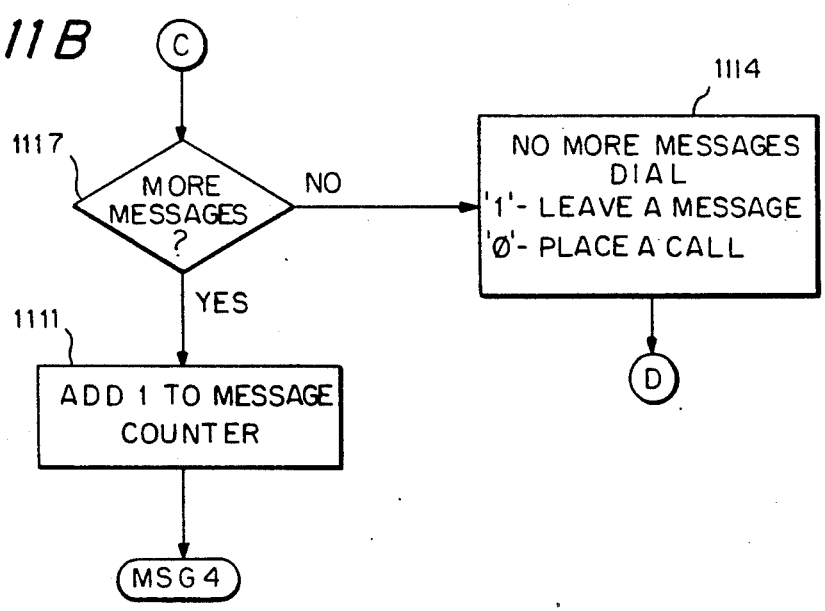
Figure 11C:
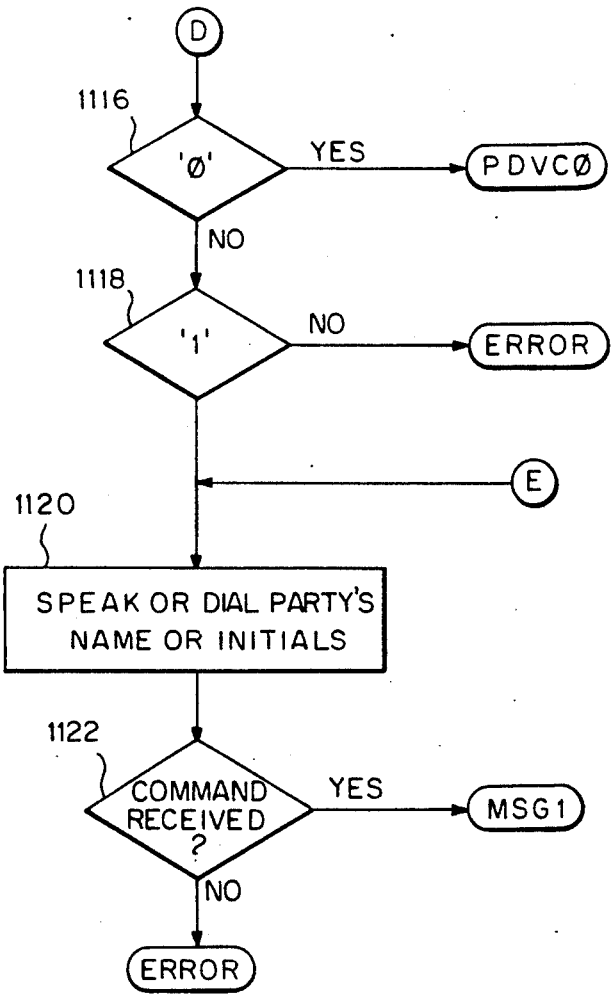

FIGS. 11A, 11B or 11C illustrate the routine for retrieving messages which starts at node MSG3. At step 1100 the subscriber is asked whether he wishes to retrieve messages by dialing a "1" or leave messages by dialing a "2". If the subscriber dials a "2" at step 1102, control is passed to the portion of the routine which drives the leaving of messages, at step 1120. If, at step 1104 the subscriber has dialed a "1", the System determines at step 1106 whether any messages are stored for retrieval by the subscriber. If neither a "1" or "2" has been chosen, at step 1104 an appropriate error message is delivered.

If at step 1106 any messages are stored, control passes through node MSG4 to step 1110. At step 1110, the subscriber is told either that the message for a particular person was delivered at a particular time to the party to whom it was delivered or that the message was received from a particular person at a particular time on a particular date. In each case, the System fills in the particular variables which are appropriate at the time. At step 1112, the subscriber is asked whether he would like the message to be repeated or would like to hear the next message. At step 1113, if the subscriber dials a "1", control is passed to node MSG4 and the message is repeated. At step 1115 if a "2" is dialed, indicating that the subscriber chooses to hear the next message, the System checks at step 1117 (see FIG. 11B) whether there are any more messages. If so, the message counter is incremented for accessing the next message (step 1111) and control is passed back to step 1110. If there are no further messages, at step 1114 the subscriber is so informed and given the choice to dial a "1" to leave a message or "0" to place another call. Control is passed to step 1116.

At step 1106, if no messages appear for the subscriber, he is so informed and asked whether he would like to leave a message or place another call at step 1108.

As shown in FIG. 11C, if the subscriber has dialed a "0", at step 1116 the control is passed to node PDVC0. If at step 1118 the subscriber has dialed a "1", control is passed to the portion of the routine in which the subscriber may dial a number to leave another message, shown at step 1120. If neither a "0" or a "1" has been dialed, an appropriate error routine is entered and an error message is delivered.

At step 1120, the subscriber is asked to speak the party's name to which he wishes to place a call or to dial a party's initials. At step 1122, the System determines whether the party's name or initials was understood. If so, control is passed to node MSG1. If not, an appropriate error message is generated. It is understood that here, as in FIG. 9A steps 1038-1046, the subscriber is given a number of opportunities to speak the name so that it is understood by the System.

Figure 12A:
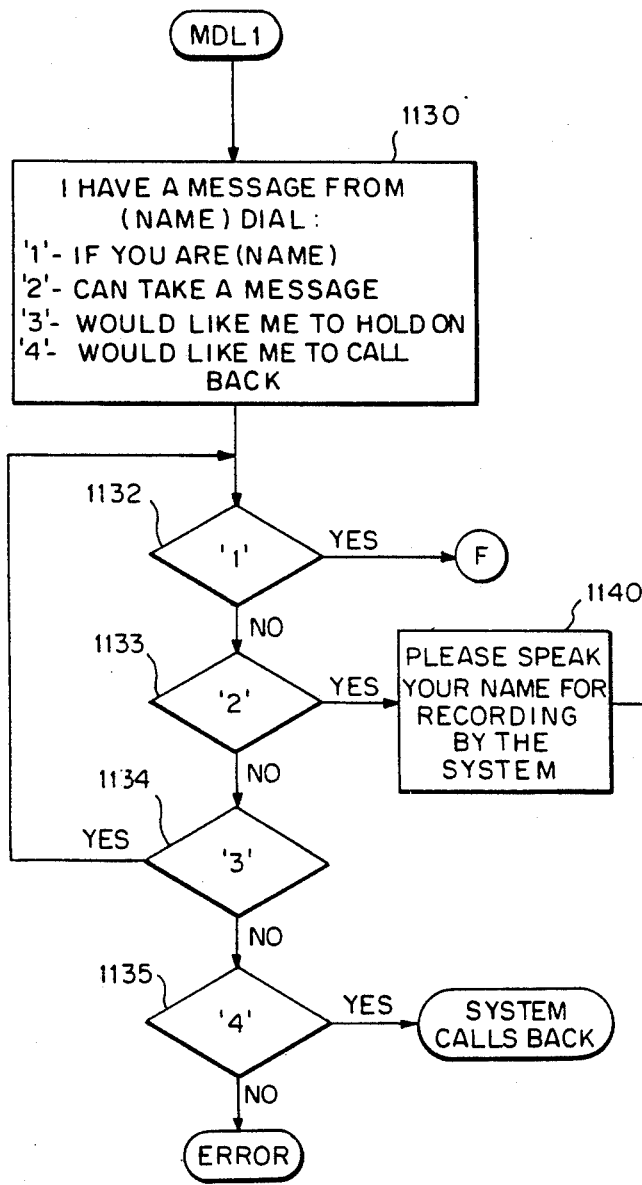
FIGS. 12A and 12B are flowcharts of the message delivery routine of the stored program sequence according to the present invention.
Figure 12B:
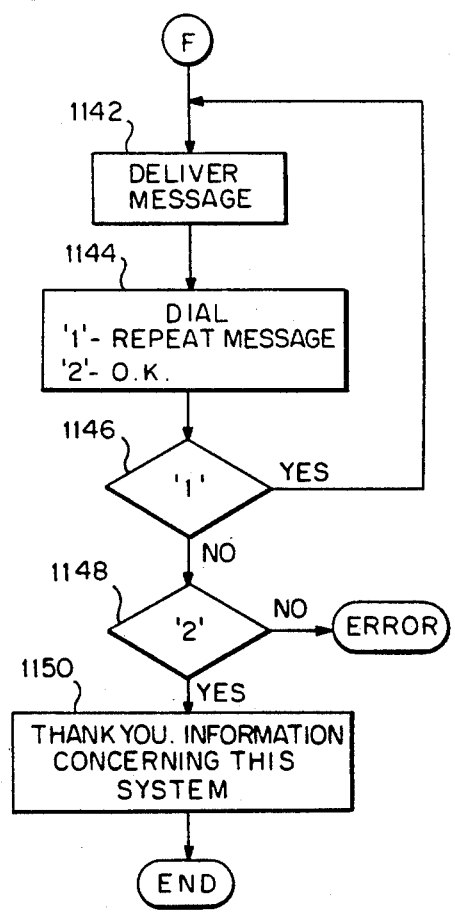

In FIGS. 12A and 12B, the routine which is used for message delivery is illustrated, beginning with node MDL1. In the event the subscriber has indicated that he wishes the System to repeatedly dial a party's number in order to deliver a message at steps 1170 and 1188 in FIGS. 10A and 10B, the System dials the called party's number.

When the call is answered, at step 1130 the System tells the answerer that it has a message from a particular person for a particular person, where the System inserts the names of the people involved. The person who answers the phone is asked to dial a "1" if they are the person to whom the message is to be delivered, a "2" if they can take the message for the other person, a "3" if they would like the system to wait for a time while the person to whom the message is to be delivered comes to the phone, or "4" if the System should call back at a later time.

At step 1132, if a "1" has been dialed, control is dialed at step 1133, the System asks the person to speak his or her name so that it may be recorded and used to confirm delivery of the message, shown at step 1140. If a "3" has been dialed at step 1134, the System merely enters a wait stage until a "1", "2", or a "4" is dialed. At step 1135, if a "4" is dialed, the System enters a routine which allows it to call back at a later time. If none of these numbers are dialed, an appropriate error message is delivered.

At step 1142 (FIG. 12B), the System delivers the recorded message and at step 1144 asks whether the subscriber would the like the message to be repeated or whether the message was understood. If at step 1146 the subscriber dials a "1" to request that the message be repeated, control is passed back to step 1142. If a "2" has been dialed at step 1148, control passes to step 1150, at which point the answerer is given prerecorded information relating to the System. After step 1150, the message delivery routine is ended. If neither a "1" nor a "2" has been dialed at step 1148, an appropriate error routine is entered and an error message is generated.

Figure 13A:
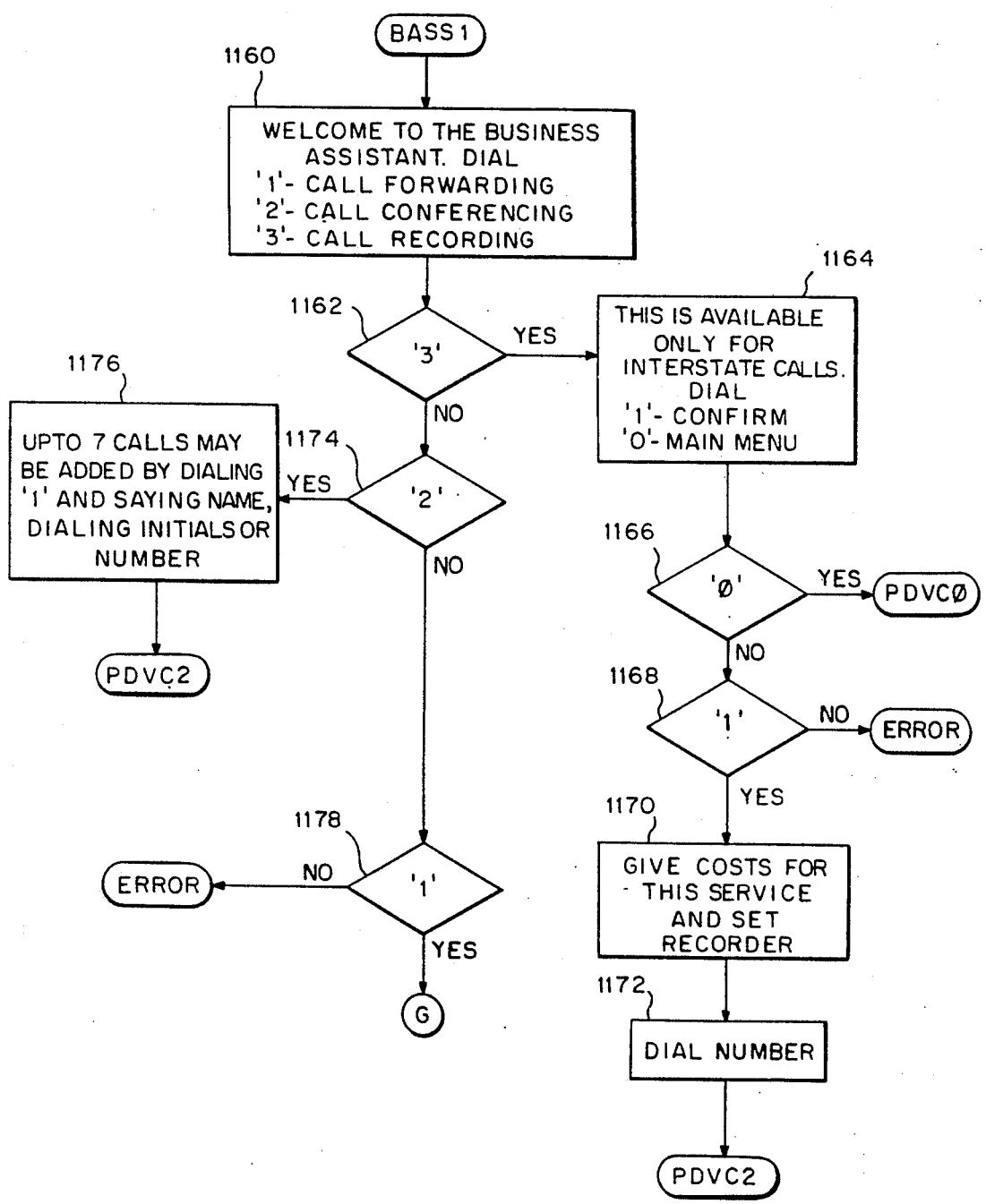
FIGS. 13A and 13B are flowcharts of the business assistant routine of the stored program sequence according to the present invention.
Figure 13B:
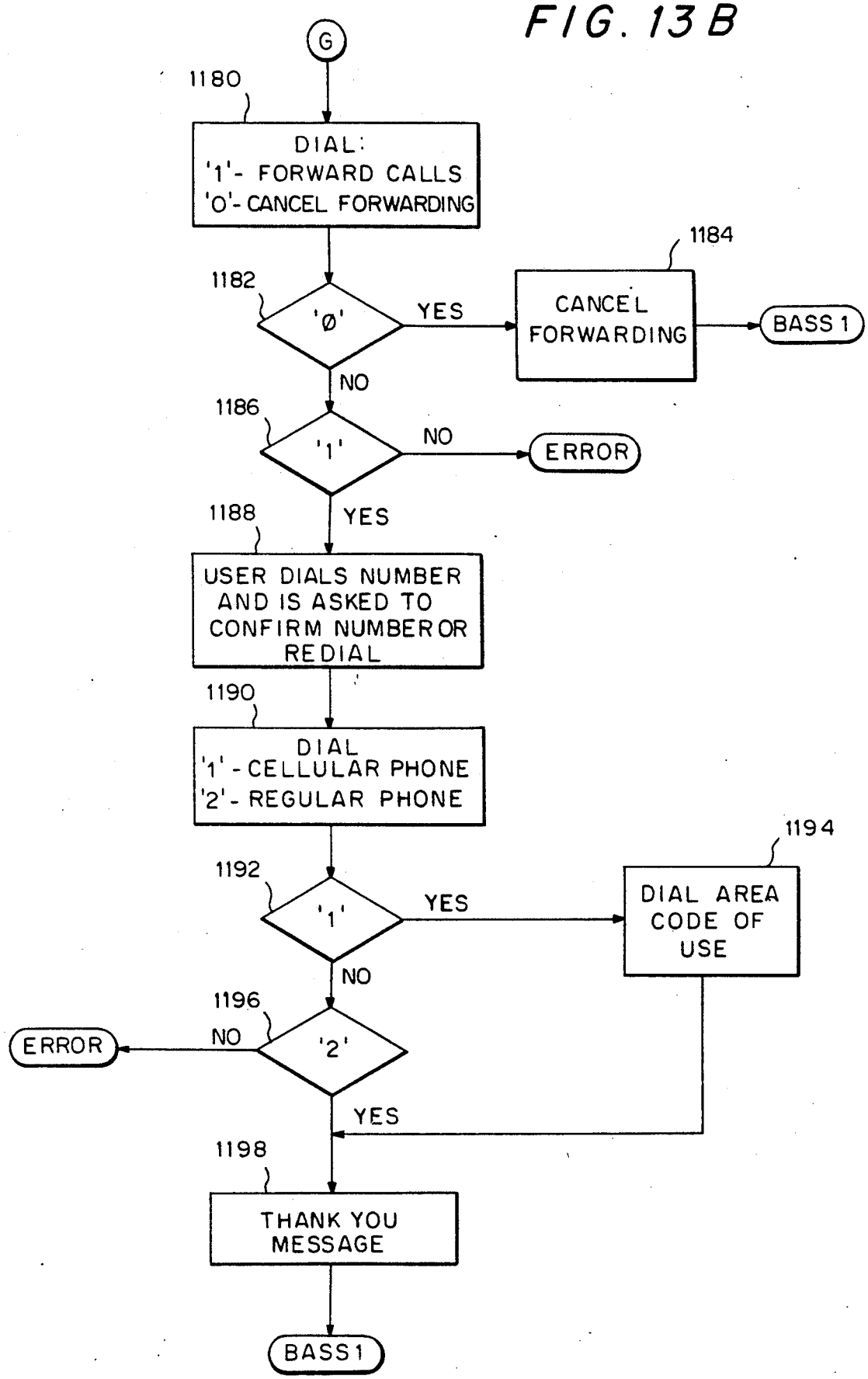

FIGS. 13A and 13B illustrate the business system routine which is entered at node BASS1. At step 1160, the subscriber is informed that he has entered the business assistant portion of the System and is given the choice of the call forwarding option, the call conferencing option, or the call recording option.

It is important to note that the features presented in the business assistant, as well as the messaging services, are available at anytime in the middle of a call. This is particularly important with respect to the call conferencing feature in that if the subscriber is speaking with one party and during the middle of the call requires that another party be added to that call, he need only dial a "0" to return to the main menu, followed by "3" for the business assistant, followed by a "3" for the call conferencing feature.

At step 1162, if the subscriber has dialed a "3" indicating the call recording feature, he is informed at step 1164, that the feature is only available for interstate calls and he is asked to confirm by dialing a "1" that it is an interstate call, or dial a "0" to return to the main menu. At step 1166 if a "0" has been dialed, control passes to node PDVC0. At step 1168 if a "1" has been dialed, control passes to step 1170. If neither is dialed, the appropriate error message is generated after entry of the appropriate error routine. At step 1170, the subscriber is informed of the charges associated with the call recording feature and at step 1172, the subscriber is asked to indicate the number that he would the System to call and control is passed to node PDVC2. This call will be digitally recorded and stored in the System's data storage files 26 for later retrieval, as with any recorded message.

At step 1174 if a "2" has been dialed indicating the call conferencing feature, control passes to step 1176. At step 1176, the subscriber is informed that up to seven calls may be added by dialing a "1" followed by either saying the name as stored in the personal directory or dialing the telephone number. Control is then passed to node PDVC2.

At step 1178, if a "1" is not received, but another number has been dialed in error by the subscriber, an appropriate error message is delivered upon entry into an error routine.

A "1" at step 1178 indicates that the subscriber has selected the call forwarding feature. At step 1180, shown in FIG. 13B, the subscriber is asked whether he would like to indicate a number to which calls may be forwarded by dialing a "1", or whether he would like to cancel the previous forwarding number by dialing a "0". At step 1182 if a "0" has been dialed, the forwarding number is cancelled at step 1184, and control passes back to node BASS1. At step 1186 if a "1" has been dialed, control passes to step 1188. If neither a "0" or a "1" has been dialed, the appropriate error message is delivered.

At step 1188, the subscriber dials a number to which his calls from VIPs may be forwarded and he is asked to confirm the number as dialed or redial the number. At step 1190, the subscriber is asked if the number belongs to a "cellular" phone, or to a regular phone. At step 1192, if a "1" has been dialed, indicating a "cellular" phone, the area code of use of the "cellular" is obtained at step 1194. If a regular phone has been indicated, control passes to node BASS1, after a thank you message is delivered at step 1198. If neither "1" nor a "0" is received, an appropriate error message is generated upon entry of an error routine. At step 1198, a thank you message is delivered and control passes back to node BASS1.

Figure 14:
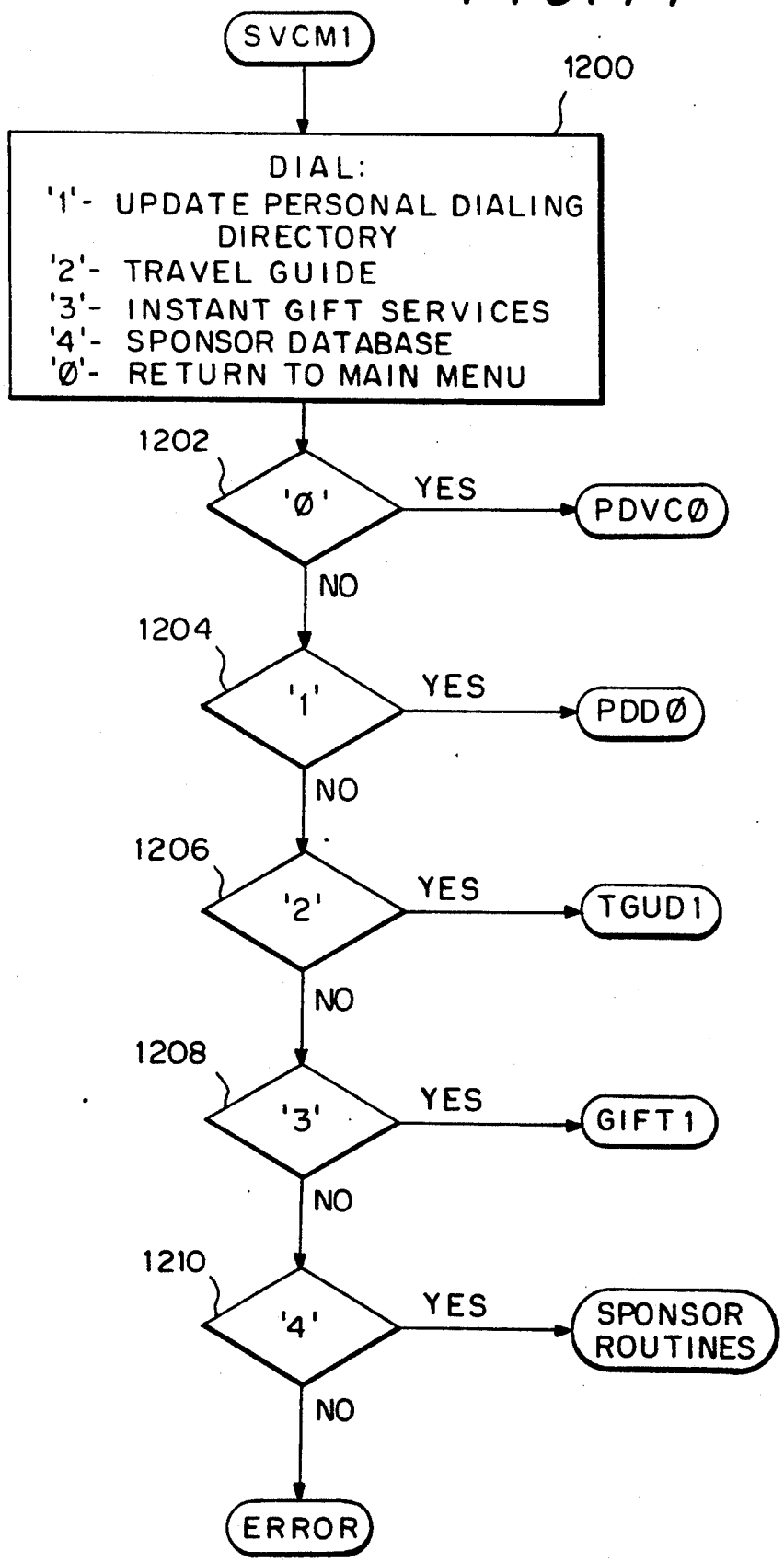
FIG. 14 is a flowchart of the service menu routine of the stored program sequence according to the present invention.

FIG. 14 illustrates the service menu routine starting at node SVCM1. This routine is merely a menu routine which is selected from the System main menu. At step 1200, the subscriber is given a choice as to whether he wants to update his personal dialing directory, or access the travel guide, the instant gift services, the sponsor database, or return to the main menu. As the passage of control is clear from flowchart, the figure will not be further discussed herein.

Figure 15:
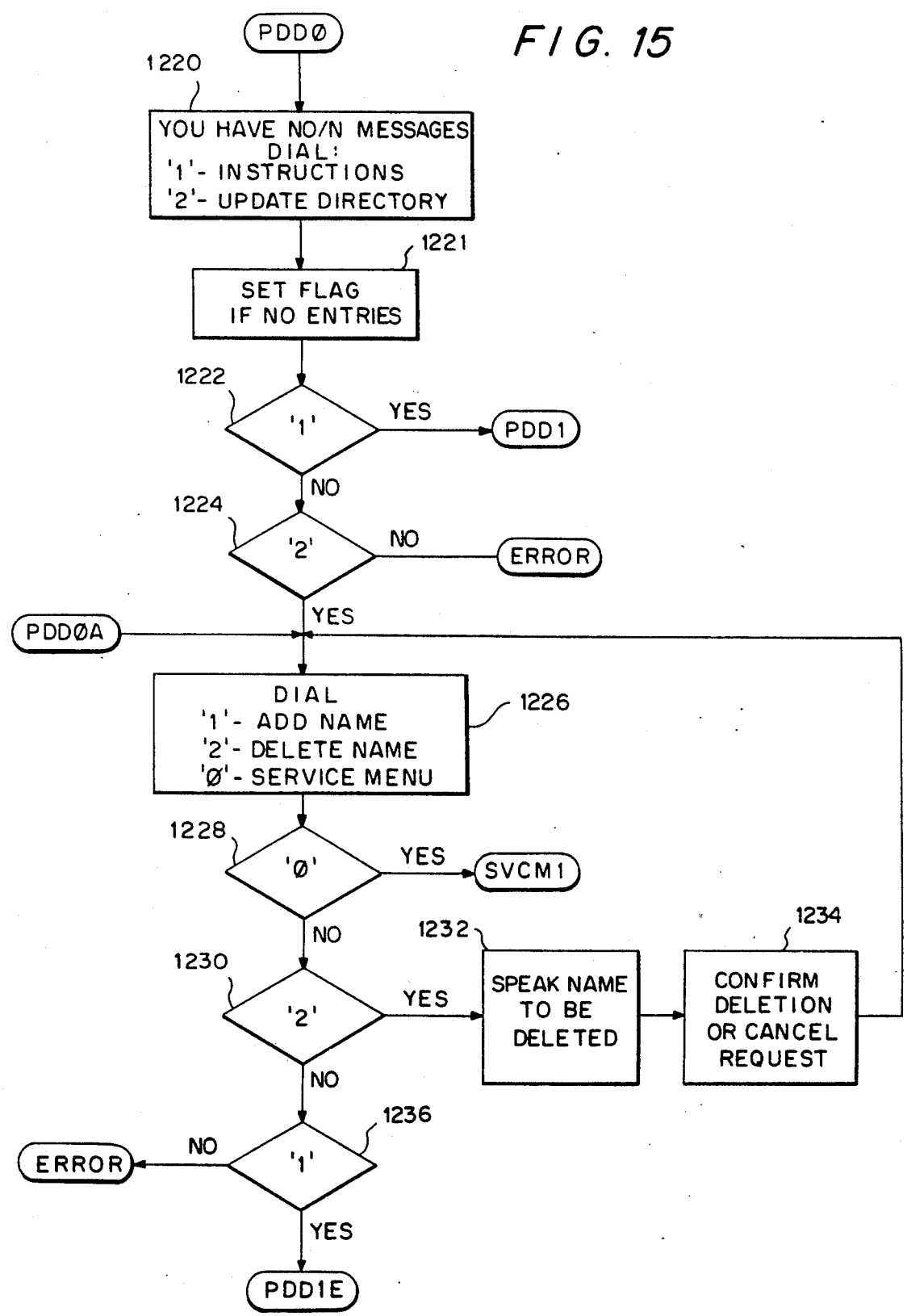
FIG. 15 is a flowchart of the routine to update the personal dialing directory in the stored program sequence according to the present invention.

FIG. 15 illustrates the routine entered when the subscriber chooses to update his personal dialing directory from the service menu. The routine, which starts at node PDD0, begins, at step 1220, by telling the subscriber how many entries he currently has in his dialing directory and asking him whether he would like to receive instructions by dialing a "1" or update his directory by dialing a "2". At step 1221 the System sets a flag internally if the subscriber has no entries in his directory. At step 1222, if a "1" has been dialed, control passes to node PDD1, described in FIG. 16A. At step 1224 if the subscriber dials a "2", control passes through node PDD0A to step 1226. If neither a "1" or "2" has been dialed, an appropriate error routine is entered.

At step 1226, the subscriber is asked to choose whether he would like to add names to the directory by dialing a "1", delete names from the directory by dialing a "2", or return to the service menu by dialing a "0". At step 1228 if a "0" has been dialed, control is passed to the service menu routine, node SVCM1 described in FIG. 14. At step 1230 if the subscriber chose to delete a name by dialing a "2", at step 1232 he is asked to speak the name which he would like to be deleted or dial the initials for that name. At step 1234, he is asked to confirm the deletion or cancel his request (specifics not shown in the flowchart) and control is passed back to node PDD0A to give him the opportunity to further update his directory. At step 1236, if the subscriber chooses a "1", control is passed to node PDD1E described in FIGS. 16B and 16C. If neither a "0", "1" or "2" has been chosen, an appropriate error routine is entered.

Figure 16A:
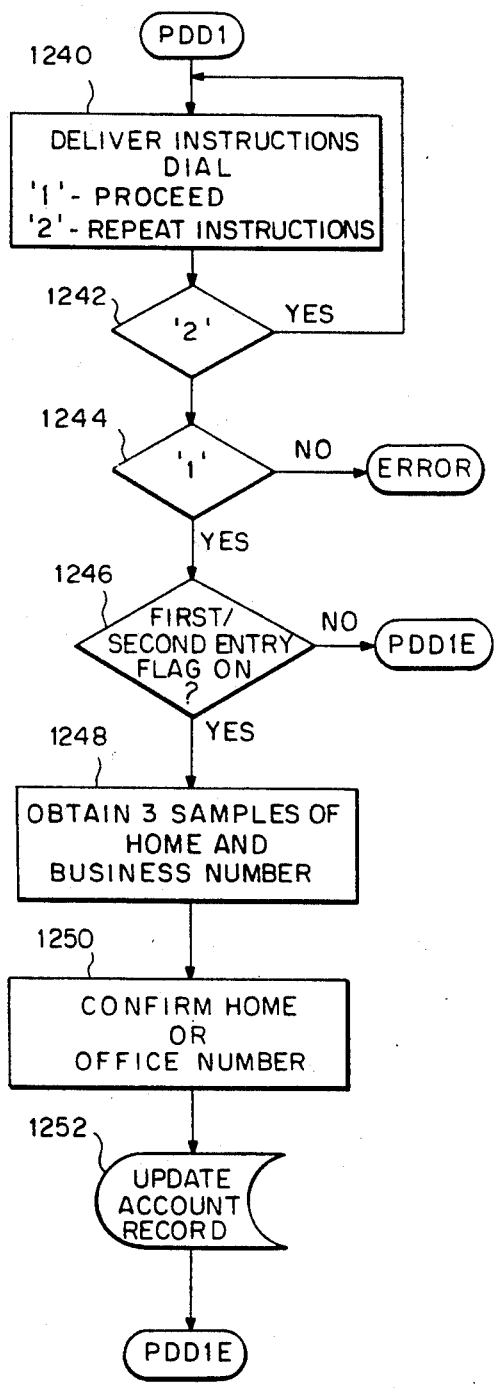
FIGS. 16A, 16B and 16C are flowcharts of the routine to create the personal dialing directory in the stored program sequence according to the present invention.
Figure 16B:
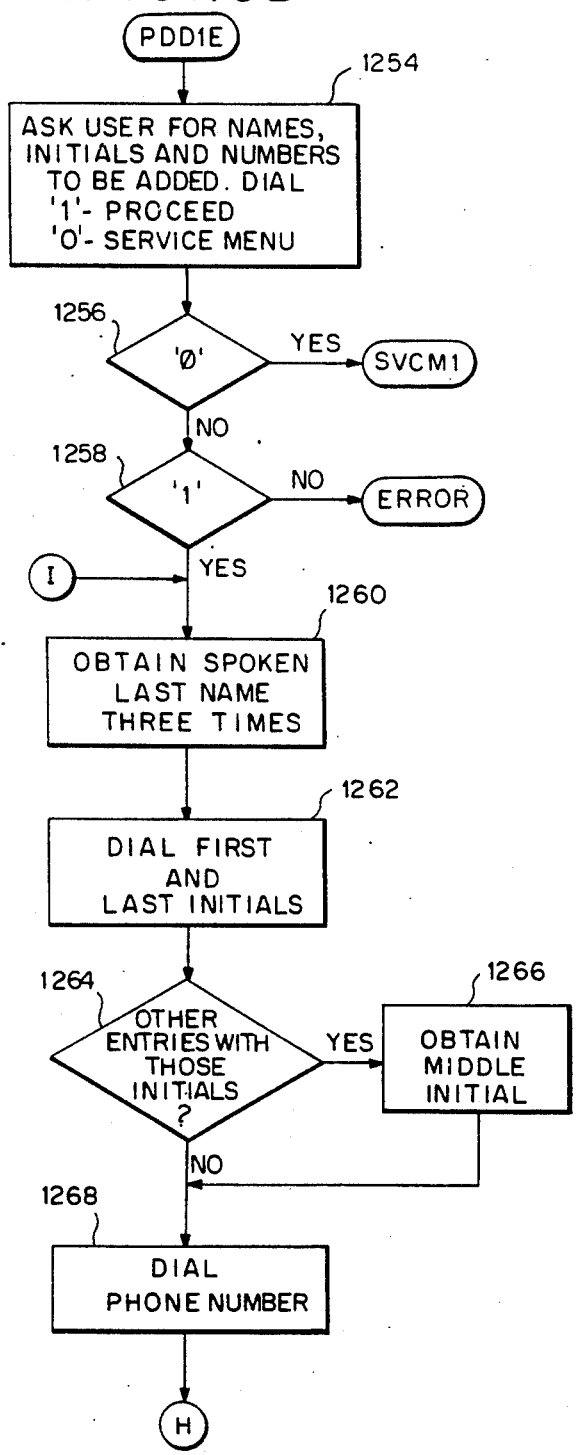
Figure 16C:
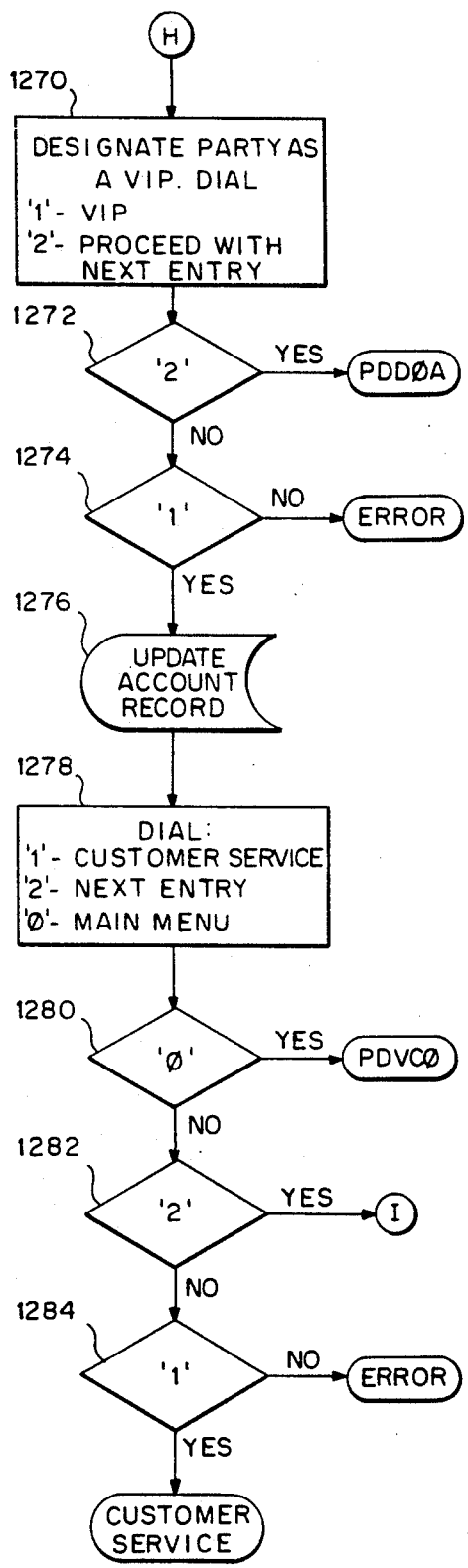

FIGS. 16A, 16B, and 16C describe the routine for creating a new personal dialing directory. This routine is entered when the person is a new subscriber and is creating his personal dialing directory for the first time.

FIG. 16A starts at node PDD1. At step 1240, the instructions concerning the operation of this routine are delivered to the subscriber. The subscriber is then given the opportunity to indicate whether he would like the instructions to be repeated or whether he would to proceed at this time. If neither option is chosen, an appropriate error routine is entered.

At step 1242, if the subscriber chooses a "2" to repeat the instructions, the instructions are repeated by returning to step 1240. In the event the subscriber chooses to proceed and so dials a "1", step 1246 determines whether the entry is the first or second to be made in the new directory by means of a flag which has been set in the System software (see FIG. 15, step 1221). The first entry in the directory is the home number while the second is the office number of the subscriber.

If it is the first entry, steps 1248-1252 allow the System to obtain three samples of the subscriber's home and office telephone numbers, as spoken by the subscriber. Three samples are necessary for the speaker dependent voice recognition system to accurately identify the speaker when he speaks the sample phrase at a later time. The home and office numbers are confirmed by the subscriber at step 1250 and the account record number record is updated by the System at step 1252.

At step 1246, if the entry made is not the first or second entry in the directory, control is passed directly to node PDD1E, shown in FIGS. 16B and 16C.

After the subscriber has entered his home and office number, at step 1254, he is informed that he will be asked for names, initials, and telephone numbers to be added to the directory and asked if he would like to proceed or return to the service menu. If he chooses a "0" at step 1256, control is returned to the service menu, node SVCM1 described in FIG. 14. If he chooses to proceed by dialing a "1" at step 1258, the System will allow him to add further names to the directory.

At step 1260, the subscriber is asked to speak the last name of the person to be entered into the directory three times. At step 1262, he is asked to dial first and last initials of that person. Step 1264 checks the current directory to determine whether he has previously entered a person's name having the same first and last initials as dialed. It is understood that these are telephone initials and that there is a possibility of duplication. In the event that a previous entry have the same initials as that just dialed, he is asked to provide a middle initial at step 1266 for further identification. At step 1268, the subscriber is asked to dial the telephone number to be stored including the area code.

At step 1270, shown in FIG. 16C, the subscriber is asked to identify the person just entered as a VIP if he so desires, by dialing "1". He may dial a "2" if he would like to proceed with the next entry. If a "2" chosen at step 1272, control passes back to node PDD0A, shown in FIG. 15. If a "1" is chosen at step 1274, control passes to step 1276. If neither is chosen, an error routine is entered. At step 1276, the System updates the account record appropriately indicating that the person entered into the directory is a VIP.

As mentioned above, designating a person as a VIP gives him additional privileges within the System. In particular a call from a VIP may be forwarded directly to the subscriber's telephone number upon request by the subscriber by entering the business System routine and using the call forwarding option.

At step 1278, the subscriber is given the opportunity to contact customer service to obtain additional calling cards for VIP's by dialing a "1". If the subscriber would like, he may dial a "2" to make another entry into the directory or a "0" to return to the main menu. If the subscriber chooses a "0" at step 1280, control is passed node PDVC0 described in FIG. 8B. If the subscriber dials a "2" at step 1282, control is passed to step 1260, shown in FIG. 16B. If the subscriber chooses a "1" at step 1284 to be connected to customer service, the System dials the customer service number and connects the subscriber to the customer service department. If neither of a "0", "1", or "2" has been dialed, an appropriate error routine is entered.

Figure 17:
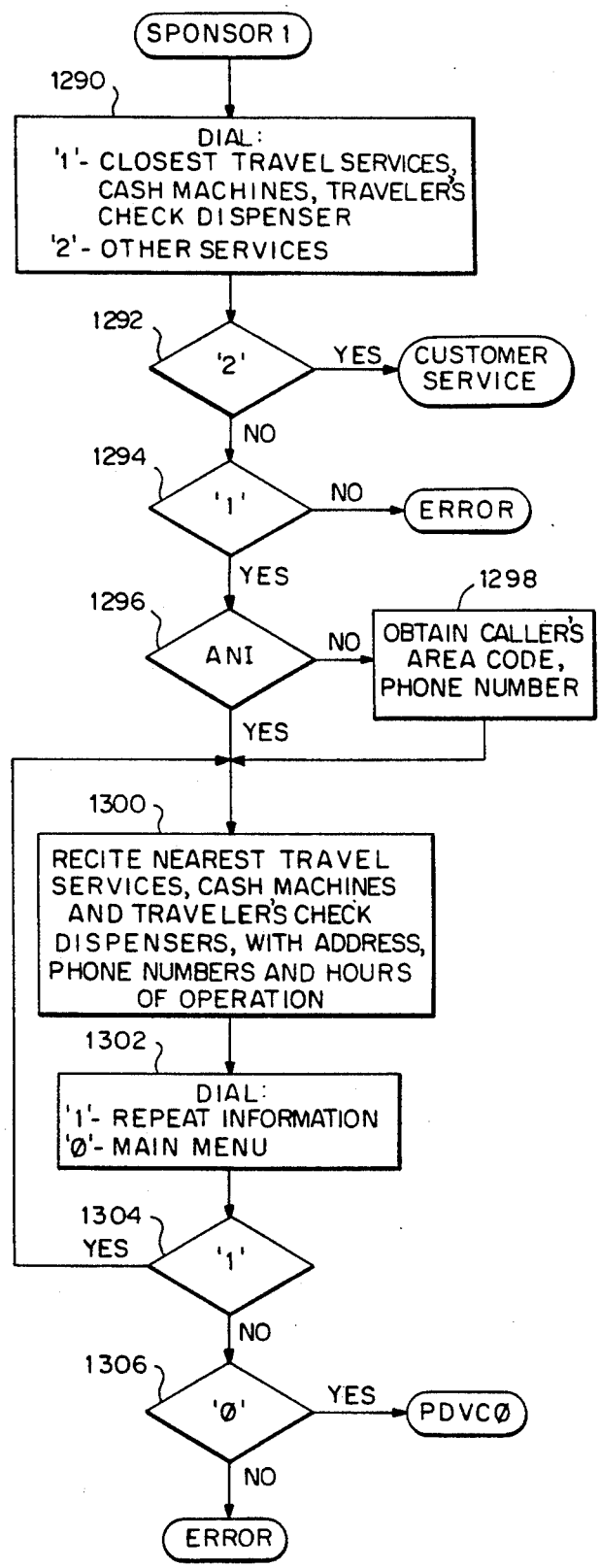
FIG. 17 is a flowchart of the sponsor emergency services routine of the stored program sequence according to the present invention.

FIG. 17 illustrates the routine for accessing the sponsor travel guide information, beginning at node SPONSOR1. At step 1290 the subscriber is asked whether he would like to retrieve information relating to the closest travel services, cash machines or travellers check dispensers by dialing a "1" or access other services by dialing a "2". If the subscriber chooses a "2" at step 1292, he is connected to the sponsor's customer service center. At step 1294 if the subscriber chooses a "1", control is passed to step 1296. If neither a "1" or "2" is chosen, an appropriate error message is generated upon entry into and error routine.

At step 1296, if Automatic Number Identification (ANI) is not available, the subscriber is asked to dial the area code and telephone number from which the call is originating at step 1298. Once the System determines the location of the originating telephone at step 1300, either from ANI or from the subscriber, the subscriber is informed of the nearest travel service, cash machine, or travellers check dispenser with the address, telephone number and hours of operation thereof. At step 1302, the subscriber is asked whether he would like to have this information repeated or place another call. If the subscriber chooses to repeat the information by dialing a "1" at step 1304, control is passed back to step 1300. If the subscriber dials a "0" to place another call, control is passed to node PDVC0. If neither number is dialed, an appropriate error message is delivered upon entry into an error routine.

FIGS. 18A and 18B disclose the travel guide routine of the System. The routine is entered at node TGUD1. At step 1310, the subscriber is asked to dial a "0" to return to the service menu, a "1" to make reservations, a "2" to access the restaurant guide, or "3" to access emergency services. At step 1320, if none of those options are chosen, an error routine is entered.

At step 1312, if the subscriber has chosen a "0", control is passed to node SVCM1 for the service routine described in FIG. 14. At step 1314, if the subscriber chooses a "1", he is connected to 24-hour reservation center at step 1316, followed by termination of that call. If the subscriber chooses a "3" at step 1318, control is passed to node SPONSOR1 for the emergency services routine described in FIG. 17. If the subscriber chooses a "2" at step 1320, control passes through node RGUD1 to step 1322.

At step 1322, the subscriber is asked to dial the originating area code and telephone number so that the System may use this information to access the restaurants nearest to the subscriber's location. At step 1324, the subscriber is asked to choose the type of food he desires, such as steak houses, seafood, French, Italian, Chinese, or Japanese cuisine. At any time during the access to the restaurant guide, the subscriber may dial "0" to be returned to the travel guide menu at step 1310 (not shown in flowchart).

At step 1326, shown in FIG. 18B, the database is accessed based on the type of food chosen by the subscriber. At step 1328, the System recites the selections of the closest restaurants, if any, providing the opportunity, at any time, for the subscriber to request that the System call the restaurant directly by dialing the number. If the System is told to dial a particular number, by the user pressing a predetermined telephone key (not shown in flowchart), at step 1330 the subscriber is asked to confirm the selection.

At step 1332, the subscriber is asked to dial a "1" to be connected directly to the restaurant or a "0" to return to the travel guide menu. At step 1334 if the subscriber dials a "1", a call placed to the restaurant chosen. At step 1336, if the subscriber chooses a "0", control is returned to node TGUD1. If neither option is chosen, an appropriate error routine is entered and an error message is delivered.

Figure 19:
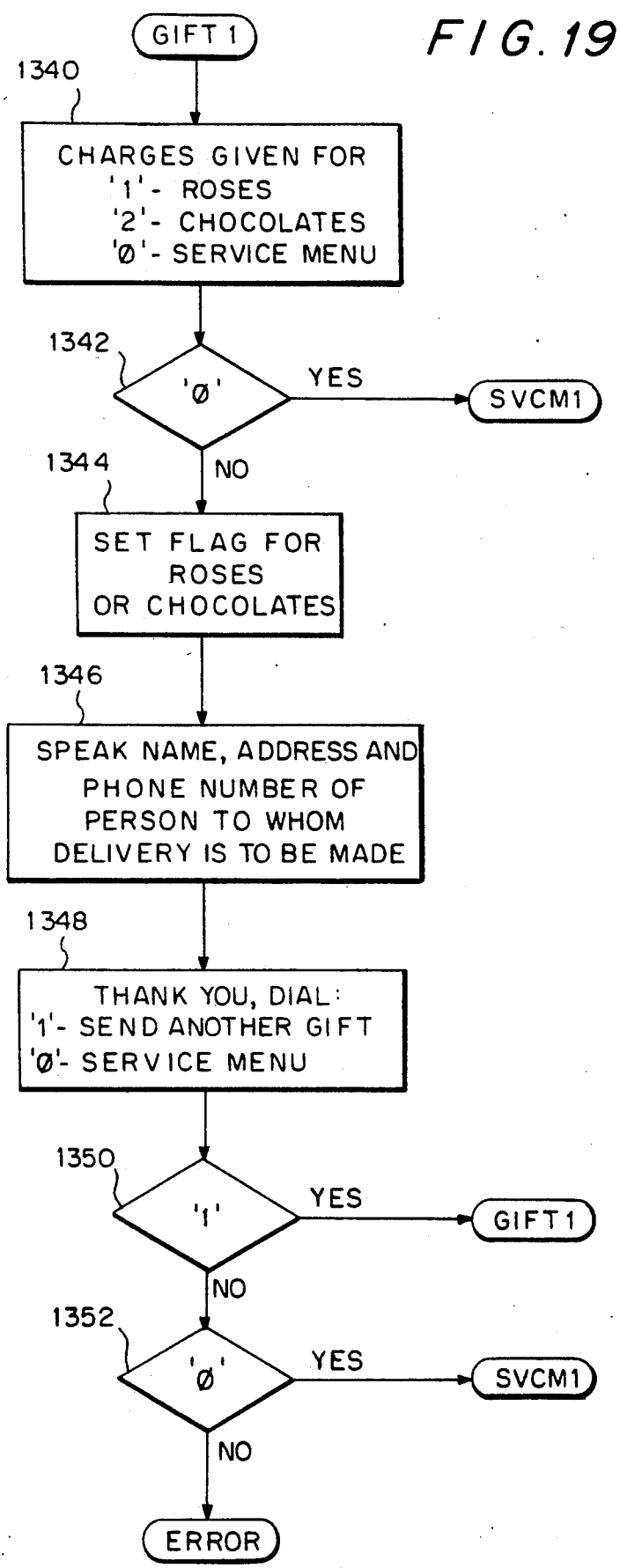
FIG. 19 is a flowchart of the instant gift service routine of the stored program sequence according to the present invention.

FIG. 19 illustrates the routine which is accessed by the subscriber if he chooses the instant gift services option of the service menu. The routine is entered at node GIFT1 and starts at step 1340 by informing the subscriber of the charges for ordering roses or chocolates and giving the subscriber the following options. He may dial a "1" to order roses, a "2" to order chocolates, or a "0" to return to the service menu.

At step 1342, if the subscriber dials a "0", control is passed to the service menu at node SVCM1 described in FIG. 14. At step 1344, a flag is set based on the subscriber's response to whether he would like to order roses or chocolates. At step 1346, the subscriber is asked to enter the name, address and phone number of the person to whom the delivery is to be made. At step 1348, a thank you message is delivered and the subscriber is asked to dial a "1" to send another gift or a "0" to return to the service menu. If he dials a "1" at step 1350, control is passed to node GIFT1. If the subscriber dials a "0" at step 1352, control is passed to node SVCM1. If neither is chosen, an appropriate error message is delivered upon entry into an error routine.

Figure 20A:
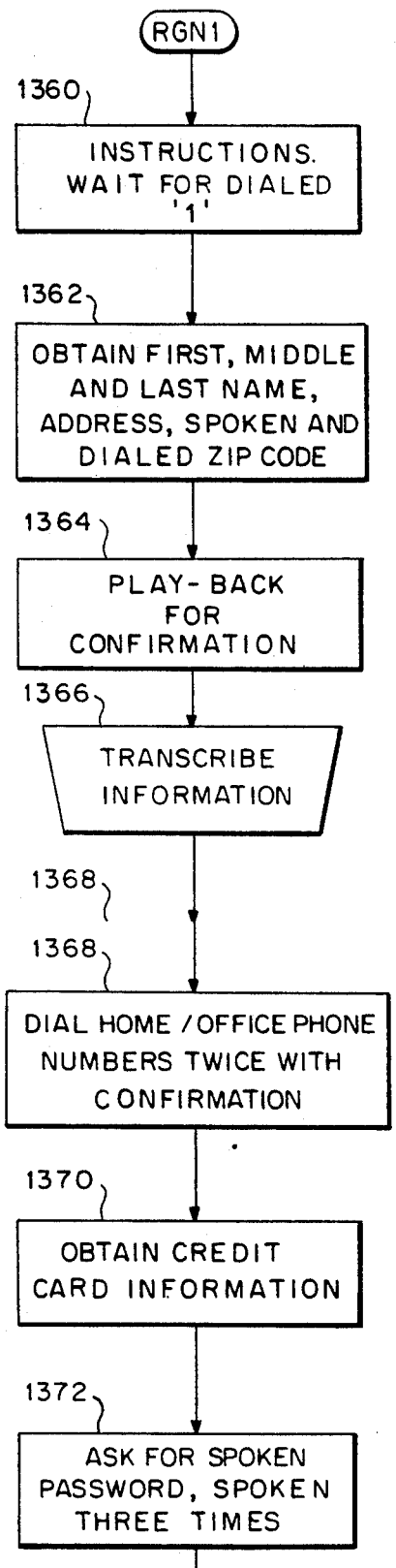
FIGS. 20A and 20B are flowcharts of the new subscriber entry routine of the stored program sequence according to the present invention.
Figure 20B:
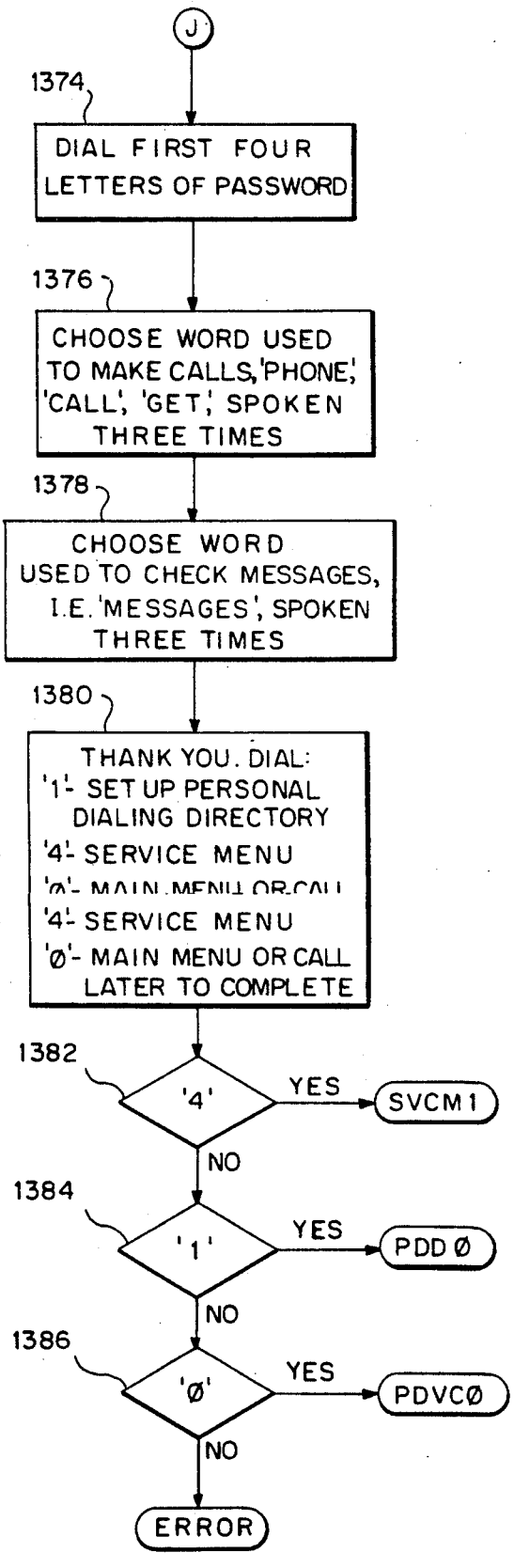

FIGS. 20A and 20B describe the subscriber registration routine which a person accesses when he is a first time caller entering the System to become a subscriber. The routine is entered at node RGN1 and at step 1360, the person is given instructions for proceeding through the new subscriber routine. He is asked to dial a "1" when he is ready to proceed.

At step 1362, the System obtains the first, middle initial, last name and the address including the zip code of the person. In particular, the person is asked to speak his name and address and dial his zip code. At step 1364, the System replays the information obtained in step 1362 for confirmation and he is given the opportunity to correct any mistakes, although this portion is not shown in the flowchart. At step 1366, the information concerning his name and address will be transcribed by System operators.

At step 1368, the person is asked to dial his home and office numbers and confirm that they have been correctly dialed. At step 1370, the System obtains the credit card number and information from the person. The person can then be billed directly to this credit card.

At step 1372, the person is asked to speak a password three times. The speaker may choose the password so that he will remember it and is asked to speak it three times so that the System will be able to identify him correctly at a later date. At step 1374 (FIG. 20B) he is asked to dial the first four letters of the password for storage by the System. At step 1376, the person is asked to choose a word which the System will recognize as his instruction to place a telephone call, such as "phone", "call" or "get". Again, the person is asked to repeat this word three times for later recognition. At step 1378, the person is likewise asked to choose a word which the System will recognize as an instruction to check his messages, such as "messages". Again, the person is asked to repeat this word three times. At this time it may also be possible to have the subscriber select other key words for selected functions, such as making another call (returning to the main menu), leaving a message, etc.

At step 1380, an appropriate thank you message is delivered and the person is asked to use a "1" to set up his personal speed dialing directory, a "4" to return to the service menu or a "0" to return to the main menu or call back later. At step 1382, if the person chooses a "4", control is passed to node SVCM1 described in FIG. 14. At step 1384, if a "1" is chosen, control is passed to node PDD0 described in FIG. 15. At step 1386, if the person chooses a "0", control is passed to node PDVC0 as described in FIG. 8B. If none of these options are chosen, an appropriate error message is delivered upon entry into an error routine.

Figure 21A:
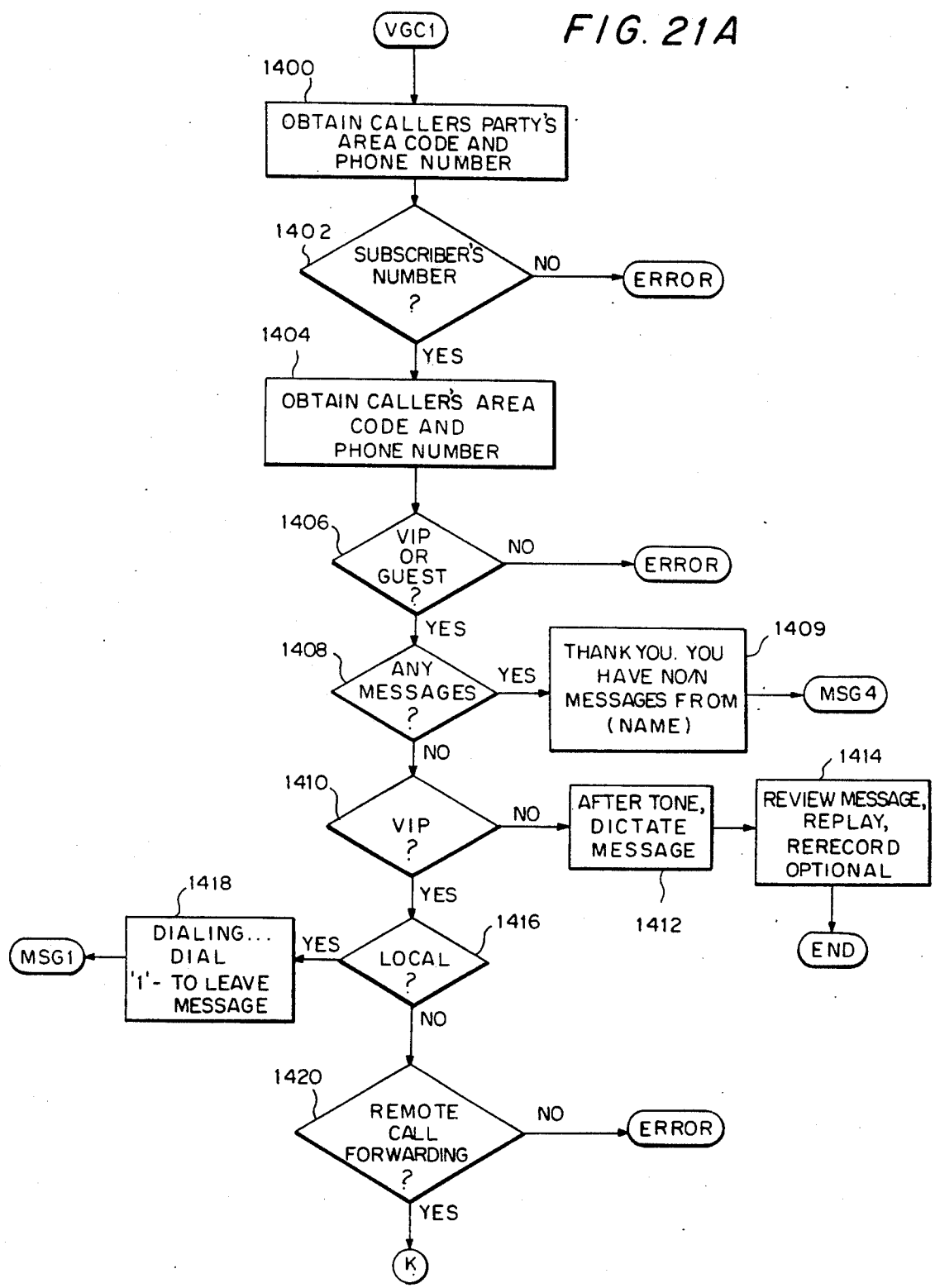
FIGS. 21A and 21B are flowcharts of the VIP/Guest message retrieval and deposit routine of the stored program sequence according to the present invention.
Figure 21B:
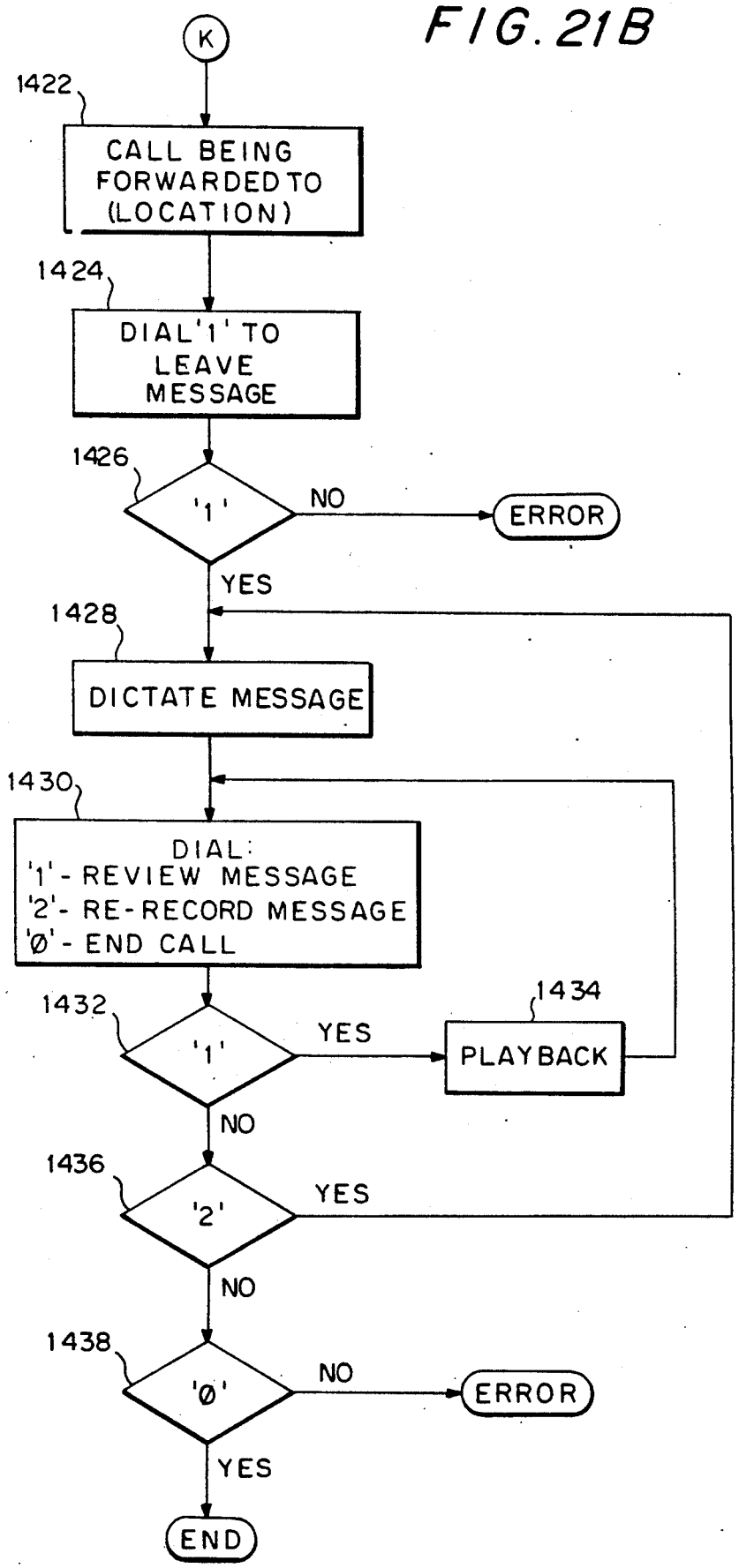

FIGS. 21A and 21B illustrate the routine by which a person who is not a subscriber accesses the System to retrieve his messages. The routine is entered at node VGC1 when the person's call comes in on a particular INWATS number which is given by the subscribers to their guest and VIPs. At step 1400, the person who has dialed the System is asked to enter his party's (i.e. subscriber's) telephone number including area code. At step 1402, the System checks whether the number dialed belongs to a subscriber. If not, an appropriate error routine is entered.

At step 1404, the person is asked to dial his home or office telephone number. At step 1406, if the dialed number does not belong to a guest or VIP of the identified subscriber, an appropriate error routine is entered. If the person is a guest or a VIP and messages have been stored for him, at step 1408, control is passed to step 1409 where he is given an appropriate thank you message and told whether he has any messages which has been stored in the System. Control is then passed node MSG4, described in FIGS. 11A, 11B and 11C.

At step 1410 the System determines whether the caller is a VIP. If not, step 1412 asks the caller, i.e. a guest, to dictate a message after the tone. Step 1414 lets the caller review and/or rerecord the previously dictated message, after which the call is terminated.

At step 1416, the System determines whether the VIP's call is local, that is that the subscriber has not left another number to which his VIPs' call should be forwarded. If there is no forwarding number, step 1418 indicates to the caller that the original number is being dialed and that he may dial a "1" at any time to leave a message. If a "1" is received, control is passed to node MSG1, described in FIGS. 10A and 10B.

At step 1420, it is determined whether a call forwarding number has been left for the VIP. If not, an error routine is entered. If there is a call forwarding number, at step 1422 shown in FIG. 21B, the caller is so informed, and at step 1424 the call forwarding number is dialed and he is informed that he may dial a "1" at any time to leave a message. At step 1426 if a "1" is not received by the System after a given period of time, the System may enter an error routine. At step 1428, assuming a "1" has been received by the System, the caller is asked to dictate a message. At step 1430 the VIP is asked if he would like to review his message, rerecord the message or end the call. Steps 1432 through 1438 clearly describe the sequence of events based on the options shown in step 1430.

Although not specifically included in the flowcharts, the System will extensively use novice bits which are automatically turned on and off in response to the subscriber's usage of the System. In this way, the System will be able to adapt itself and the instruction texts delivered to each individual subscriber to tailor itself to that subscriber's usage level. It is understood that the particular implementation of these novice bits is within the ordinarily skilled artisan.

It is understood that the error routines entered, and the error messages delivered by the System will depend on the situation which has caused the error. The particular configuration of these routines and messages are well within capabilities of the ordinarily skilled artisan.

It is understood that the specific words used in the scripts prerecorded and used by the software are variable and so have not been specifically enumerated for each routine. Any scripts which instruct the user to use the System are contemplated by the present invention.

It is further understood that the records in the account database will be updated at frequent times during the software. These updates are not always enumerated in the above description but are well within the capabilities of the ordinarily skilled artisan. Likewise, access by the software to the various databases is not always specifically pointed out but would be clear to an ordinarily skilled artisan from the program context.

It is understood that at any time the subscriber may dial a "0" to return to the previous menu. Thus he may return to the main menu to place another call by going back through whatever levels of menus he is currently at in order to get the main menu. Thus, at the termination of any call, the subscriber merely dials a "0" to end the call and make another one, without having to reaccess the System.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A telephone communications node comprising:
   a telephone switch having at least one incoming line and at least one outgoing line for switching calls therebetween;
   an audio response unit for receiving incoming audio communications and for generating and transmitting other audio communications; and
   single control means for executing a stored program sequence based upon the incoming audio communications received by said audio response unit, said control means and said program sequence directly controlling both said audio response unit and said telephone switch such that, based on said incoming audio communications and said stored program sequence, a call received by the telephone communications node may be switched to an outgoing line directed to a number other than that which the caller originally called,
   wherein said control means comprises
   generating means for generating a user-interactive main menu;
   access means for providing access to a user-defined speed dialing directory;
   message means for delivering a vocal message to a particular person at a particular telephone number;
   dialing means for providing direct dialing of user-chosen telephone numbers;
   sponsor means for providing access to a sponsor database; and
   business means for providing user-chosen business assistant functions.

2. The telephone communications node according to claim 1, wherein said access means comprises:
   instruction means for providing instructions to enable said user to create said speed dialing directory, said speed dialing directory being accessed by a code representing each telephone number stored in the directory;
   code means for obtaining at least one chosen code from said user representing at least one particular party to be called; and
   retrieval means for retrieving at least one telephone number stored in said directory which corresponds to said at least one chosen code.

3. The telephone communications node according to claim 1, wherein said message means comprises:
   message storage means for recording and storing said vocal message responsive to an instruction received from said user;
   repeat dialing means for repeatedly dialing said particular telephone number until a response is received for a predetermined time at predetermined time intervals; and
   message relay means for replaying said stored message upon receiving said response.

4. The telephone communications node according to claim 1, wherein said dialing means comprises obtaining means for obtaining said user-chosen telephone numbers.

5. The telephone communications node according to claim 1, wherein said business means comprises:
   conferencing means for providing call conferencing;
   forwarding means for providing call forwarding for forwarding a call from a particular person to a user's remote location; and
   recording means for recording a call.

6. A telephone communications node for providing telephone communication services to a subscriber, comprising:
- a telephone switch having at least one incoming and at least one outgoing line for switching calls therebetween;
- an audio response unit for receiving incoming audio communications from the subscriber and for generating and transmitting other audio communications to the subscriber;
- a stored program sequence programmed with information supplied by the subscriber; and
- single control means for executing said stored program sequence based upon the incoming audio communications received by said audio response unit from the subscriber, said control means and said program sequence directly controlling both said audio response unit and said telephone switch such that, based on said incoming audio communications and said stored program sequence, a call received from the subscriber may be switched to an outgoing line directed to a number other than that which the subscriber originally called.

7. A telephone communication node in accordance with claim 6, wherein said control means and said program sequence include directory means for receiving directory programming information from the subscriber, including telephone numbers and codes corresponding thereto, and permitting said directory information to be accessed by the subscriber by said codes corresponding to each of said telephone numbers entered in the directory, whereby, upon receipt from the subscriber of an incoming audio communication representing one of said codes, the call received from the subscriber is switched to an outgoing line directed to the number programmed by the subscriber as corresponding to said code.

8. A telephone communication node in accordance with claim 6, further including identification means for verifying that a caller is a subscriber.

9. A telephone communication node in accordance with claim 6 wherein said telephone switch includes a plurality of local network nodes, each having a plurality of incoming and outgoing telephone trunk lines, each of said local network nodes being connected to a regional network node; and wherein said audio response unit, said stored program sequence and said single control means are part of said regional network node.

10. A telephone communication system, comprising:
- at least two telephone communication nodes in accordance with claim 9; and
- a central network control system connected to each of said regional network nodes, for controlling administrative functions associated with said telephone communication system.

11. The telephone communications node according to claim 6, wherein said audio response unit comprises recognition means for performing speaker recognition.

12. The telephone communications node according to claim 11, wherein said recognition means performs speaker dependent voice recognition.

13. The telephone communications node according to claim 6, wherein said audio response unit comprises generating means for voice generation for delivering said other audio communications according to predetermined user scripts.

14. The telephone communications node according to claim 13, further comprising digital storage means for storing said predetermined user scripts.

15. The telephone communications node according to claim 6, further comprising a central processing unit connected within said audio response unit wherein said stored program sequence is stored within said central processing unit.

16. The telephone communications node according to claim 6, further comprising a central processing unit external to said audio response unit and connected thereto wherein said stored program sequence is stored within said central processing unit.

17. The telephone communications node according to claim 6, wherein said telephone switch is a digital telephone switch.

18. The telephone communications node according to claim 6, wherein said incoming audio communications comprise voice and touch-tone signals.

19. The telephone communications node according to claim 6, further comprising connecting means for connecting said audio response unit to said telephone switch.

20. A telephone communication node in accordance with claim 6, wherein said control means controls said audio response unit and said telephone switch such that the switch to an outgoing line is based on information generated by said stored program sequence.

21. A telephone communications node in accordance with claim 6, wherein said audio response unit and said single control means include generating means for generating a user-interactive main menu.

22. A telephone communications node in accordance with claim 6, wherein said single control means includes access means for providing access to a user-defined speed dialing directory and for connecting the subscriber to a number from said directory selected in response to audio communications received from the subscriber.

23. A telephone communications node in accordance with claim 6, wherein said audio response unit and said single control means include message means for delivering a vocal message provided by the subscriber to a specified party at a specified number.

24. A telephone communications node in accordance with claim 6, wherein said audio response unit and said single control means include dialing means for switching the incoming call to a subscriber-chosen telephone number.

25. A telephone communications node in accordance with claim 6, wherein said single control means includes conferencing means for providing call conferencing of the incoming call with at least two numbers other than that which the subscriber originally called.

26. A telephone communications node in accordance with claim 6, wherein said audio response unit and said single control means include recording means for recording a call.

27. A telephone communications node in accordance with claim 6, wherein said telephone switch includes a plurality of local network nodes, each having a plurality of incoming and outgoing telephone trunk lines, each of said local network nodes being connected to a regional network node; and wherein said audio response unit and said single control means are part of said regional network node.

28. A telephone communication system, comprising:

at least two telephone communications nodes in accordance with claim 27; and a central network control system connected to each of said regional network nodes, for controlling administrative functions associated with said telephone communication system.

29. The telephone communications node according to claim 27, wherein each of said local network nodes comprises a digital multiplexor.

30. The telephone communications node according to claim 27, further comprising optical fiber transmission facilities connecting each of said local network nodes to its respective regional network node.

31. A method of providing telephone communication services to a subscriber, comprising:
  programming a common stored program sequence in accordance with instructions from the subscriber;
  upon receipt of a call from the subscriber, producing audio messages according to a stored user script;
  accepting audio user commands from the subscriber in response to said audio messages;
  processing said accepted commands; and
  directly controlling, using said common stored program sequence, both a telephone switch and an audio response unit responsive to said processed commands such that, based on said audio user commands and said common stored program sequence, the received call is switched to an outgoing line directed to a number other than that which the subscriber originally dialed.

32. A method of providing telephone communication services to a subscriber, in accordance with claim 31, further including the step of identifying a caller as a subscriber 33. The method of claim 31, wherein said step of accepting audio user commands comprises the step of receiving voice signals from a user over a telephone line.

34. The method of claim 33, wherein said step of processing said audio user commands comprises the step of analyzing said audio user commands using a voice recognition unit.

35. The method of claim 34, wherein the step of analyzing said audio user commands comprises the step of analyzing said audio user commands using a speaker-dependent voice recognition program.

36. The method of claim 31, wherein said step of accepting audio user commands comprises the step of receiving touch-tone signals dialed by said user on a telephone keypad.

37. The method of claim 31, wherein the step of producing audio messages comprises the step of generating a plurality of computer-generated voice messages spoken over telephone lines, the plurality of computer-generated messages including a plurality of menu selections for driving a plurality of command routines.

38. The method of claim 31, wherein the step of controlling a telephone switch and an audio response unit comprises the step of directing telephone calls through said telephone switch based on the responses given by a user to said audio messages.

39. The method of claim 31, further comprising the steps of:
  obtaining spoken responses to certain ones of said audio messages;
  comparing said spoken responses to stored samples of subscribers' voices; and
  determining if said spoken responses match any one of said stored samples for identifying a user as a subscriber.

40. A telephone communications node comprising:
  a telephone switch having at least one incoming line and at least one outgoing line for switching calls therebetween;
  an audio response unit for receiving incoming audio communications and for generating and transmitting other audio communications; and
  single control means for executing a stored program sequence based upon the incoming audio communications received by said audio response unit, said control means and said program sequence directly controlling both said audio response unit and said telephone switch such that, based on said incoming audio communications and said stored program sequence, a call received by the telephone communications node may be switched to an outgoing line directed to a number other than that which the subscriber originally called,
  wherein said telephone switch includes a plurality of local network nodes, each having a plurality of incoming and outgoing telephone trunk lines, each of said local network nodes being connected to a regional network node,
  and wherein said audio response unit and said single control means are part of said regional network node.

41. A telephone communication system, comprising:
  at least two telephone communications nodes in accordance with claim 40; and
  a central network control system connected to each of said regional network nodes, for controlling administrative functions associated with said telephone communication system.

42. The telephone communications node according to claim 40, wherein each of said local network nodes comprises a digital multiplexor.

43. The telephone communications node according to claim 40, further comprising optical fiber transmission facilities connecting each of said local network nodes to its respective region network node.

* * * * *